(12) United States Patent
Yokoyama et al.

(10) Patent No.: US 11,462,084 B2
(45) Date of Patent: Oct. 4, 2022

(54) INFORMATION PROCESSING APPARATUS, INFORMATION PROCESSING METHOD, AND PROGRAM

(71) Applicant: SONY CORPORATION, Tokyo (JP)

(72) Inventors: Ryo Yokoyama, Tokyo (JP); Osamu Ito, Tokyo (JP)

(73) Assignee: SONY CORPORATION, Tokyo (JP)

( * ) Notice: Subject to any disclaimer, the term of this patent is extended or adjusted under 35 U.S.C. 154(b) by 156 days.

(21) Appl. No.: 17/052,623

(22) PCT Filed: Jun. 5, 2019

(86) PCT No.: PCT/JP2019/022259
§ 371 (c)(1),
(2) Date: Nov. 3, 2020

(87) PCT Pub. No.: WO2019/244625
PCT Pub. Date: Dec. 26, 2019

(65) Prior Publication Data
US 2021/0241586 A1  Aug. 5, 2021

(30) Foreign Application Priority Data
Jun. 18, 2018  (JP) .............................. JP2018-115154

(51) Int. Cl.
*H04B 3/36* (2006.01)
*G08B 6/00* (2006.01)
(52) U.S. Cl.
CPC ..................................... *G08B 6/00* (2013.01)

(58) Field of Classification Search
CPC ................................. G08B 6/00; G06F 3/016
See application file for complete search history.

(56) References Cited

U.S. PATENT DOCUMENTS

| | | | |
|---|---|---|---|
| 2008/0120029 A1* | 5/2008 | Zelek | G01C 21/20 701/469 |
| 2016/0027338 A1* | 1/2016 | Ebeling | G10H 1/045 340/4.12 |
| 2020/0153602 A1* | 5/2020 | Kamat | H04L 65/1069 |

FOREIGN PATENT DOCUMENTS

| | | |
|---|---|---|
| JP | 2006-163579 A | 6/2006 |
| JP | 2014-182816 A | 9/2014 |
| JP | 2017-531930 A | 10/2017 |
| JP | 2018-045270 A | 3/2018 |

* cited by examiner

*Primary Examiner* — Toan N Pham
(74) *Attorney, Agent, or Firm* — Paratus Law Group, PLLC

(57) ABSTRACT

There is provided an information processing apparatus, an information processing method, and a program that can efficiently transmit a tactile signal for a plurality of tactile presentation units. A transmission apparatus breaks up a tactile signal included in content into a base tactile signal group, converts the base tactile signal group into encoded data including parameters defined for each of the broken up base tactile signals, and transmits the encoded data. A reception apparatus restores and combines the base tactile signals based on the parameters included in the encoded data to restore the tactile signal and makes a tactile presentation. The present disclosure can be applied to a content reproduction system including a tactile presentation apparatus.

23 Claims, 27 Drawing Sheets

FIG. 13

TACTILE PRESENTATION UNIT 1ch
(BASE TACTILE SIGNAL INDEX 1, TIME CODE, GAIN, LENGTH, ENVELOPE INDEX), ...
(BASE TACTILE SIGNAL INDEX 2, TIME CODE, GAIN, LENGTH, ENVELOPE INDEX), ...
...
(BASE TACTILE SIGNAL INDEX m, TIME CODE, GAIN, LENGTH, ENVELOPE INDEX), ...

TACTILE PRESENTATION UNIT 2ch
(BASE TACTILE SIGNAL INDEX 1, TIME CODE, GAIN, LENGTH, ENVELOPE INDEX), ...
(BASE TACTILE SIGNAL INDEX 2, TIME CODE, GAIN, LENGTH, ENVELOPE INDEX), ...
...
(BASE TACTILE SIGNAL INDEX m, TIME CODE, GAIN, LENGTH, ENVELOPE INDEX), ...

TACTILE PRESENTATION UNIT nch
(BASE TACTILE SIGNAL INDEX 1, TIME CODE, GAIN, LENGTH, ENVELOPE INDEX), ...
(BASE TACTILE SIGNAL INDEX 2, TIME CODE, GAIN, LENGTH, ENVELOPE INDEX), ...
...
(BASE TACTILE SIGNAL INDEX m, TIME CODE, GAIN, LENGTH, ENVELOPE INDEX), ...

FIG. 14

TACTILE PRESENTATION UNIT 1ch
(BASE TACTILE SIGNAL INDEX 1, TIME CODE, GAIN, LENGTH, ENVELOPE INDEX), ...
(BASE TACTILE SIGNAL INDEX 2, TIME CODE, GAIN, LENGTH, ENVELOPE INDEX), ...
...
(BASE TACTILE SIGNAL INDEX m, TIME CODE, GAIN, LENGTH, ENVELOPE INDEX), ...

TACTILE PRESENTATION UNIT 2ch
(BASE TACTILE SIGNAL INDEX 1, TIME CODE, GAIN, LENGTH, ENVELOPE INDEX), ...
(BASE TACTILE SIGNAL INDEX 2, 1ch, GAIN, 1ch ($t_x$->$t_y$), ENVELOPE INDEX), ...
...
(BASE TACTILE SIGNAL INDEX m, TIME CODE, 1ch+5, LENGTH, ENVELOPE INDEX), ...

TACTILE PRESENTATION UNIT nch
(BASE TACTILE SIGNAL INDEX 1, TIME CODE, GAIN, LENGTH, ENVELOPE INDEX), ...
(BASE TACTILE SIGNAL INDEX 2, TIME CODE, GAIN, LENGTH, ENVELOPE INDEX), ...
...
(BASE TACTILE SIGNAL INDEX m, TIME CODE, GAIN, LENGTH, ENVELOPE INDEX), ...

F I G. 2 2
202
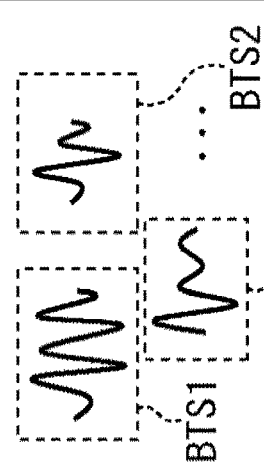
BTS2
BTS3
BTS1
204 TEACHER DATA
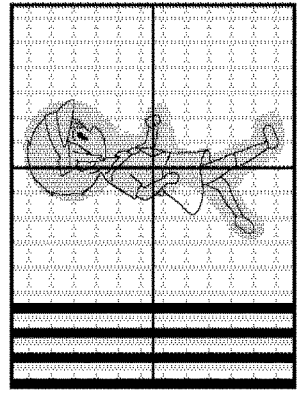
201
MULTI-DIMENSIONAL FEATURE VECTOR (VISUAL FEATURES)
MULTI-DIMENSIONAL FEATURE VECTOR (AUDITORY FEATURES)
203 FEATURE DATA

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2019/022259 (filed on Jun. 5, 2019) under 35 U.S.C. § 371, which claims priority to Japanese Patent Application No. 2018-115154 (filed on Jun. 18, 2018), which are all hereby incorporated by reference in their entirety.

TECHNICAL FIELD

The present disclosure relates to an information processing apparatus, an information processing method, and a program, and particularly, to an information processing apparatus, an information processing method, and a program that can transmit and receive tactile data of multiple channels with a low delay.

BACKGROUND ART

An apparatus is proposed that receives tactile data transmitted from a transmission device and that causes vibrators provided on a jacket or the like to vibrate in a vibration pattern based on the tactile data to thereby allow the user wearing the jacket to enjoy a sense of touch with a sense of reality (see PTL 1).

CITATION LIST

Patent Literature

[PTL 1]
JP 2018-045270A

SUMMARY

Technical Problem

Incidentally, installing more vibrators on the jacket to provide a higher sense of reality is considered in the technique of PTL 1.

However, if the number of vibrators is increased, the number of channels for the tactile data transmitted to the jacket may increase, and the transmission time of the tactile data may increase according to the number of increased channels.

The present disclosure has been made in view of the circumstances, and particularly, the present disclosure enables to efficiently transmit and receive tactile data of multiple channels.

Solution to Problem

An information processing apparatus, an information processing method, and a program according to one aspect of the present disclosure are an information processing apparatus, an information processing method, and a program including an encoding unit that encodes an input tactile signal into encoded data including parameters defining a plurality of base tactile signals in a base tactile signal group included in the input tactile signal, and a transmission unit that transmits the encoded data to a reception apparatus that causes a tactile presentation unit configured to make a tactile presentation using an output tactile signal on the basis of the encoded data to make a tactile presentation.

In the first aspect of the present disclosure, the input tactile signal is encoded into the encoded data including the parameters defining the plurality of base tactile signals in the base tactile signal group included in the input tactile signal, and the encoded data is transmitted to the reception apparatus that causes the tactile presentation unit configured to use the output tactile signal on the basis of the encoded data to make the tactile presentation to make the tactile presentation.

An information processing apparatus, an information processing method, and a program according to a second aspect of the present disclosure are an information processing apparatus, an information processing method, and a program including a reception unit that receives encoded data including parameters defining a plurality of base tactile signals in a base tactile signal group included in an input tactile signal, and a decoding unit that combines the base tactile signals to decode the base tactile signals into an output tactile signal based on the parameters defining the plurality of base tactile signals included in the received encoded data.

In the second aspect of the present disclosure, the encoded data including the parameters defining the plurality of base tactile signals in the base tactile signal group included in the input tactile signal is received, and the base tactile signals are combined and decoded into the output tactile signal based on the parameters defining the plurality of base tactile signals included in the received encoded data.

Advantageous Effect of Invention

According to one aspect of the present disclosure, tactile data of multiple channels can efficiently be transmitted and received.

BRIEF DESCRIPTION OF DRAWINGS

FIG. 13 is a diagram describing an expression method of encoded data of multiple channels.

FIG. 14 is a diagram describing an expression method of the encoded data of multiple channels.

FIG. 22 is a diagram describing a tactile data encoding process using machine learning.

DESCRIPTION OF EMBODIMENTS

Hereinafter, preferred embodiments of the present disclosure will be described in detail with reference to the attached drawings. Note that in the present specification and the drawings, the same signs are provided to constituent elements with substantially the same functional configurations, and the description will not be repeated.

Hereinafter, the embodiments of the present technique will be described. The embodiments will be described in the following order.

1. Summary of Present Disclosure
2. First Embodiment
3. Second Embodiment
4. Example of Causing Software to Execute 1. Summary of Present Disclosure A summary of the present disclosure will be described with reference to FIG. 1.

Figure 1:
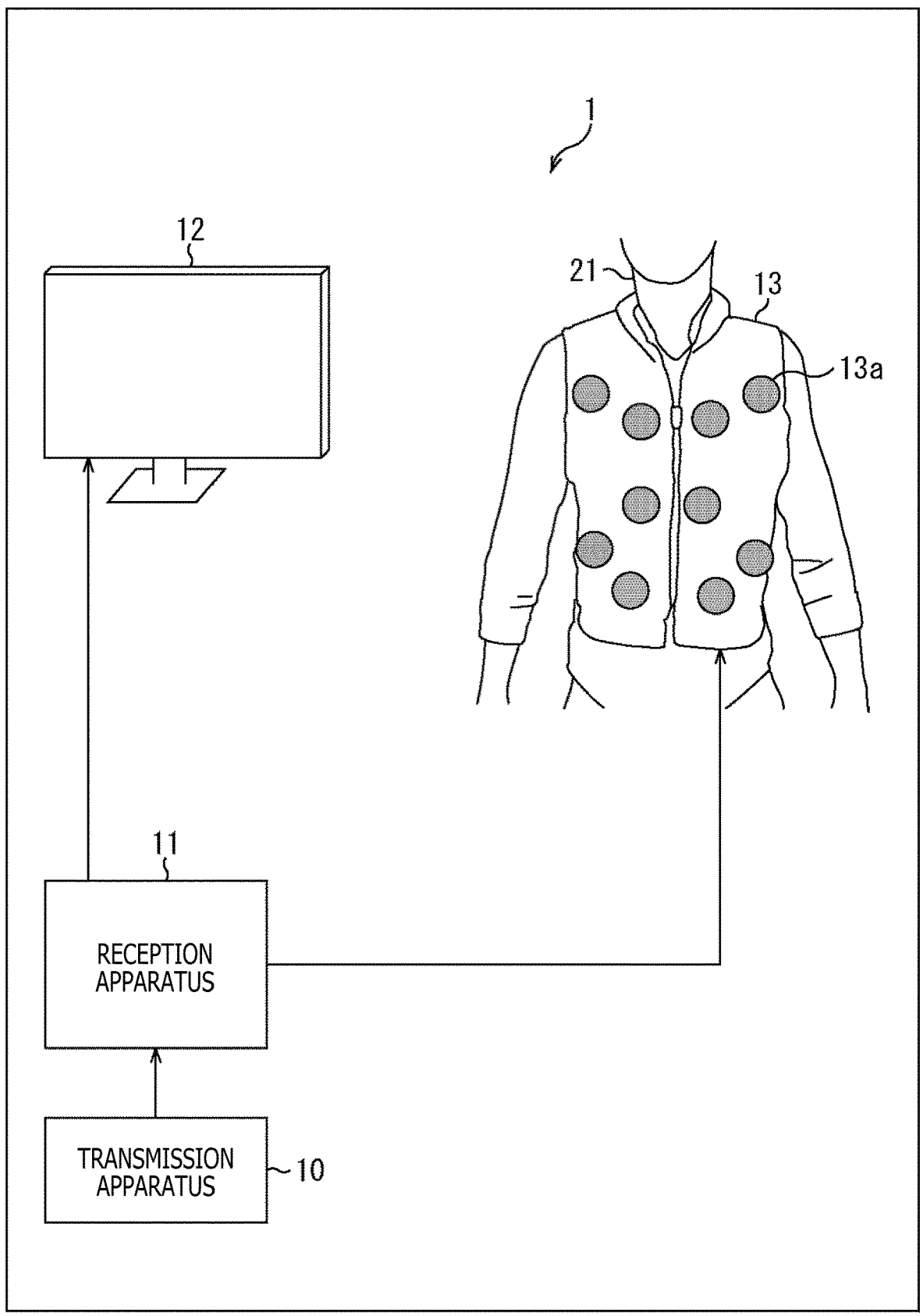
FIG. 1 is a diagram describing a summary of the present disclosure.

FIG. 1 illustrates a summary of a configuration of a content reproduction system that reproduces content including tactile data according to the present disclosure.

A content reproduction system 1 of FIG. 1 includes a transmission apparatus 10, a reception apparatus 11, a display apparatus 12, and a vest-type tactile presentation apparatus 13 worn by a user 21. A wired or wireless communication path not illustrated is reserved for each component, and the components can transfer data to each other.

The transmission apparatus 10 supplies content including video data, audio data, and tactile data to the reception apparatus 11.

The reception apparatus 11 supplies content including video data and audio data to the display apparatus 12 and causes the display apparatus 12 to display images and output sound to allow the user to view the content. Further, at the same time, the reception apparatus 11 supplies the tactile data to the tactile presentation apparatus 13 worn by the user 21 to realize the tactile presentation corresponding to the tactile data.

The vest-type tactile presentation apparatus 13 includes a plurality of vibration units 13a at positions in close contact with various parts of the body of the user 21. The vest-type tactile presentation apparatus 13 causes the vibration units 13a to independently vibrate based on the tactile data of each of the vibration units 13a supplied from the reception apparatus 11 to thereby make a tactile presentation (provide a stimulus) at each corresponding part of the body of the user 21.

The video data, the audio data, and the tactile data included in the same content correspond to each other. Therefore, the user 21 wearing the tactile presentation apparatus 13 can enjoy the video and the sound of the content displayed by the display apparatus 12 and enjoy watching the content with a higher sense of reality through the tactile presentation by the plurality of vibration units 13a based on the tactile data corresponding to the flow of the content. For example, the user can enjoy the tactile presentation in synchronization with the elapsed time of the reproduction of the displayed video and audio content.

Incidentally, although ten vibration units 13a are depicted in the tactile presentation apparatus 13 in FIG. 1, more vibration units 13a can be provided in reality.

The higher the number of vibration units 13a is, the higher the sense of reality can be. However, the number of channels for the tactile data supplied to the tactile presentation apparatus 13 increases with an increase in the number of vibration units 13a. This increases the transmission time for transmitting the tactile data of multiple channels corresponding to the plurality of vibration units 13a from the transmission apparatus 10 to the reception apparatus 11.

As a result, with the increase in the transmission time of the tactile data, the timing of the actual vibration and the tactile presentation by the vibration units 13a of the tactile presentation apparatus 13 may be delayed from the image or the sound.

Therefore, to increase the vibration units 13a to allow expressing the tactile data with a higher sense of reality for the user 21 wearing the tactile presentation apparatus 13, the time required for transmitting and receiving the tactile data needs to be reduced to suppress the delay to allow the plurality of vibration units 13a to make the tactile presentation at appropriate timing in synchronization with the video and the audio content.

<Summary of Encoding of Tactile Data>

Therefore, in the present disclosure, an estimator obtained based on frequency analysis, pattern matching, or machine learning is used to make an estimate to divide the tactile signal corresponding to the tactile data into a base tactile signal group, and the division result is used to convert the tactile data into encoded data to transmit and receive the encoded data. As a result, the tactile data can be expressed by simple parameters defining the divided base tactile signals, and the amount of data can be compressed. The delay in the tactile presentation can also be suppressed in the transmission and the reception of the tactile data of multiple channels, and as a result, the tactile data can be reproduced in synchronization with the video and the audio content.

Note that in the present specification, the tactile signal is a waveform signal expressing vibration generated by the vibration of the vibration unit 13a of the tactile presentation apparatus 13, and the tactile data is data for causing the vibration unit 13a to generate vibration corresponding to the waveform signal expressed by the tactile signal. In other words, the tactile data can also be considered as a command or a parameter supplied to the vibration unit 13*a* of the tactile presentation apparatus 13 to realize the vibration of the waveform signal corresponding to the tactile signal. Therefore, the vibration unit 13*a* vibrates based on the tactile data, and the waveform signal input to the vibration unit 13*a* and the waveform signal generated by the vibration are the tactile signals. Similarly, the display apparatus 12 displays images and outputs sound based on the image data and the audio data.

In addition, the base tactile signal group is a group of a plurality of tactile signals as bases that can be combined to generate one tactile signal. For example, in a case where two optional base tactile signals among the plurality of base tactile signals belonging to the base tactile signal group are extracted, the two extracted base tactile signals are in an orthogonal relationship with each other.

In other words, the base tactile signals belonging to the base tactile signal group are independent from each other and are not similar. That is, the base tactile signals are tactile signals not overlapping with each other.

In addition, for example, approximately several hundred types of base tactile signals are prepared as the base tactile signals belonging to the base tactile signal group, and there may be base tactile signals with the same length. It is desirable that the base tactile signal group is a group of tactile signals including specific waveform signals with various lengths, and the tactile signals are independent from each other.

Figure 2:
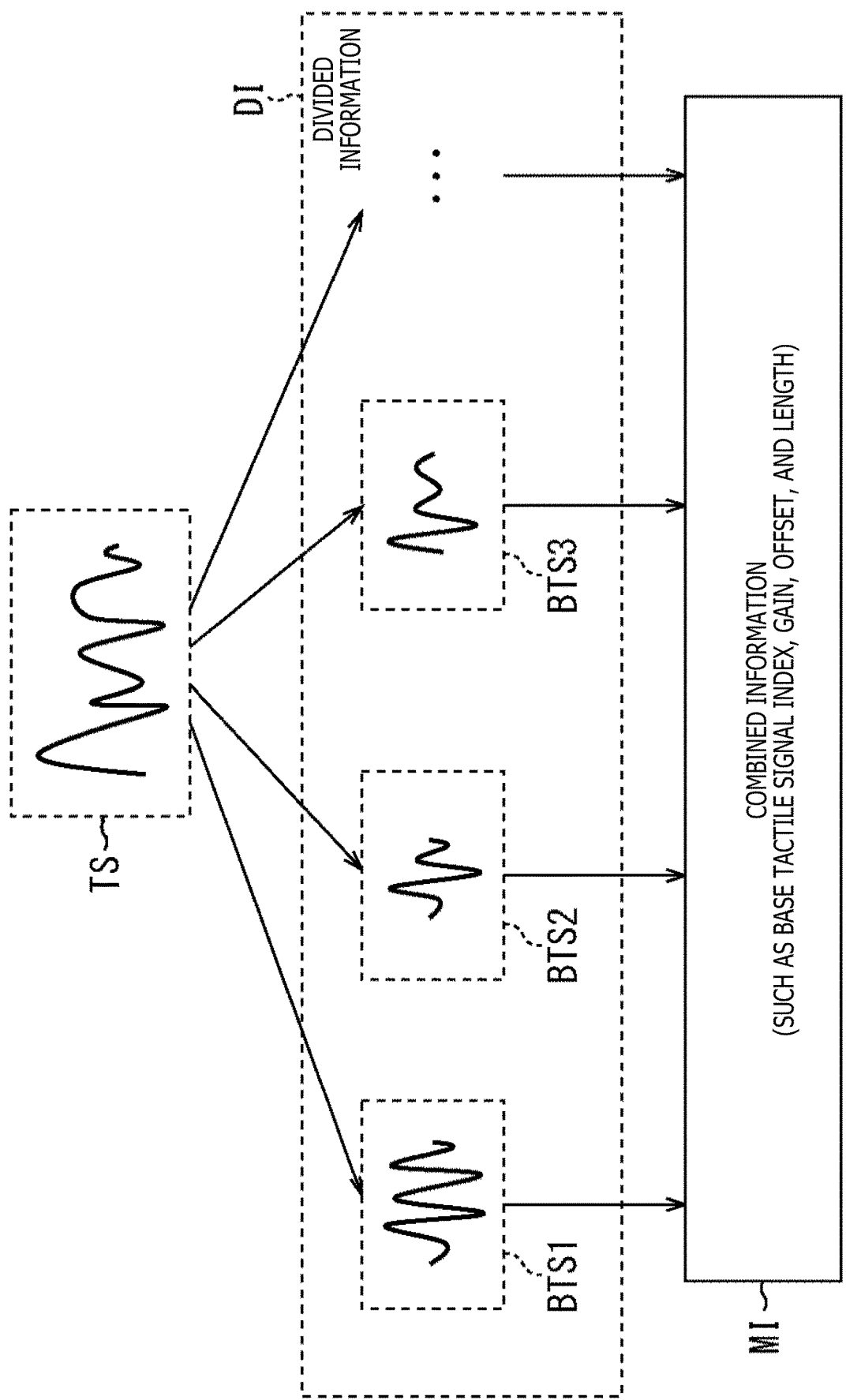
FIG. 2 is a diagram describing a summary of encoding of tactile data according to the present disclosure.
Figure 3:
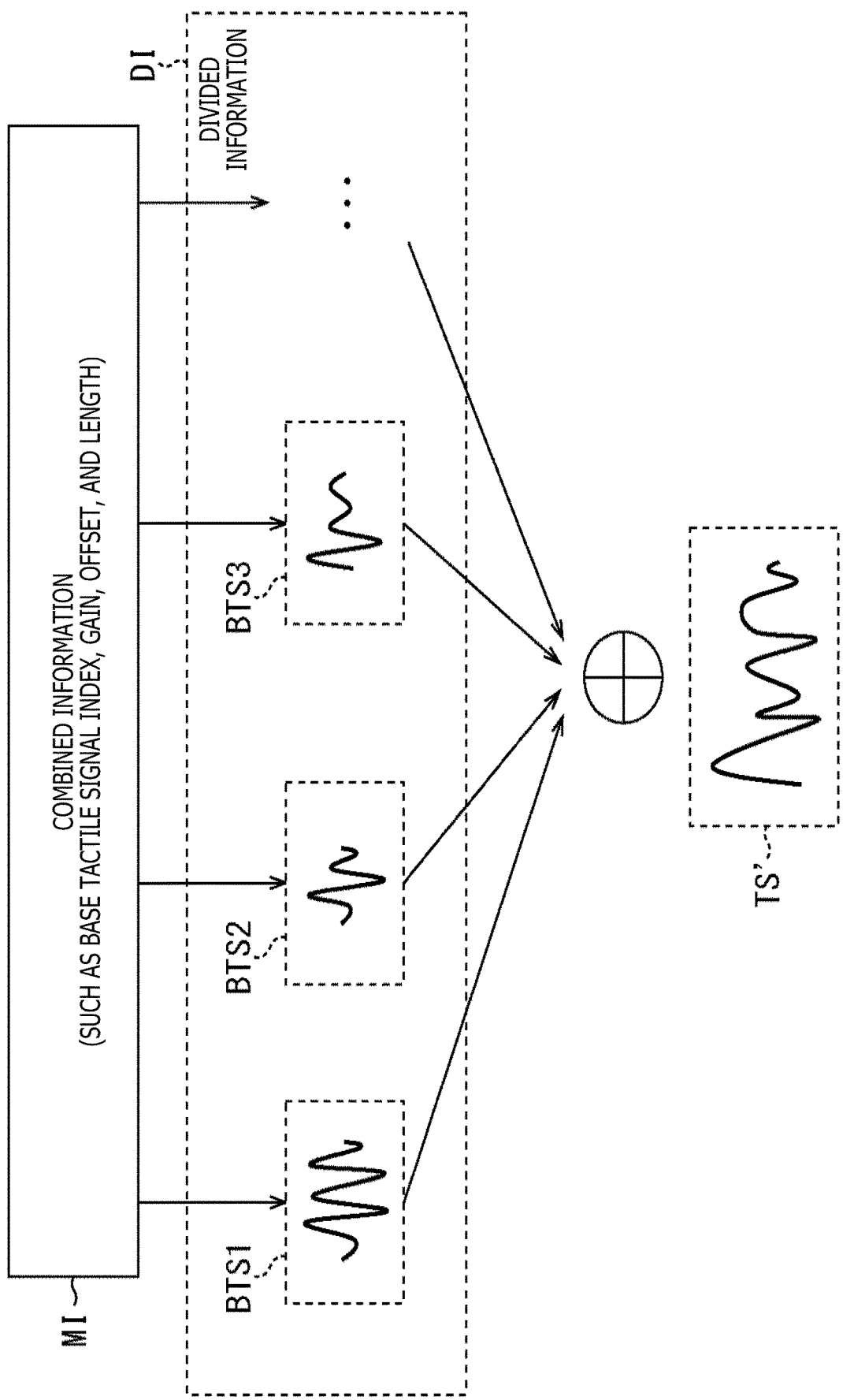
FIG. 3 is a diagram describing a summary of decoding of the tactile data according to the present disclosure.

A tactile signal TS corresponding to predetermined tactile data can be expressed as a sum of a plurality of base tactile signals, and for example, as illustrated in FIG. 2, the tactile signal TS can be divided into divided information DI including a base tactile signal BTS1, a base tactile signal BTS2, a base tactile signal BTS3, belonging to the base tactile signal group.

Note that although the divided information DI of FIG. 2 includes one base tactile signal BTS1 of one type, one base tactile signal BTS2 of another type, one base tactile signal BTS3 of still another type, . . . , the divided information DI may include a plurality of same base tactile signals.

In addition, although the base tactile signal is a tactile signal including a specific waveform signal at predetermined time, the divided information DI obtained by dividing the tactile signal TS may be divided in a state in which a gain as an increase or a decrease in the amplitude, an offset in the time direction, and the like are applied to each base tactile signal.

In the present disclosure, parameters including an index for identifying each base tactile signal and a gain, an offset in the time direction, and the like to be applied to each base tactile signal are used for each of the base tactile signal BTS1, the base tactile signal BTS2, the base tactile signal BTS3, . . . included in the divided information D1 to encode the tactile signal.

More specifically, each of the base tactile signal BTS1, the base tactile signal BTS2, the base tactile signal BTS3, . . . included in the divided information D1 is expressed by parameters, such as a base tactile signal index, a gain, an offset (time code), and a length (of time), and the signals are combined to generate combined information MI. In the present disclosure, the combined information MI is the encoded data of the tactile signal TS.

Here, the base tactile signal index is an identifier of the target base tactile signal. The gain is a gain added in the entire period of the target base tactile signal. The offset (time code) is an offset time from predetermined timing of the start of the tactile presentation by the vibration unit 13*a* based on the target base tactile signal, and the length is a length (period of time) of the target base tactile signal.

In such a way, in the present disclosure, the tactile signal TS is divided based on the base tactile signal group, and the parameters of each of the divided base tactile signals are used to encode the signal. As a result, the tactile signal TS corresponding to any tactile data is compressed into the encoded data including the combined information MI based on the base tactile signal group.

<Summary of Decoding of Tactile Data>

Decoding of the encoded data into the tactile data is realized by executing a process opposite the encoding method.

That is, the encoded data is the combined information MI in which the parameters, such as a base tactile signal index, a gain, an offset, and a length, of each of the base tactile signal BTS1, the base tactile signal BTS2, the base tactile signal BTS3, . . . included in the divided information D1 are combined. Therefore, the encoded data as the combined information MI is divided to extract the parameters defining each of the base tactile signal BTS1, the base tactile signal BTS2, the base tactile signal BTS3, . . . stored in advance, and a process based on the extracted parameters is applied to the base tactile signal BTS1, the base tactile signal BTS2, the base tactile signal BTS3, . . . to restore the divided information DI.

Further, the waveform signals of the base tactile signal BTS1, the base tactile signal BTS2, the base tactile signal BTS3, . . . restored as the divided information DI by using the parameters are added to restore an original tactile signal TS' (tactile signal TS' close to the tactile signal TS), and the tactile data is generated based on the restored tactile signal TS'.

That is, the tactile signal TS is converted into the divided information DI based on the base tactile signal group, and the parameters defining each of the base tactile signals included in the divided information DI are used to encode the divided information DI into the combined information MI. The divided information DI is restored from the combined information MI as the encoded data, and the tactile signal TS' is restored. Therefore, the tactile data can highly efficiently be compressed, transmitted, and received.

As a result, even when the tactile data of multiple channels is transmitted and received, the series of processes can be realized at a high speed. Even when the plurality of vibration units 13*a* is vibrated, the delay in the timing of vibration can be suppressed. Therefore, the vibration units 13*a* can be vibrated in synchronization with the video and the audio content.

Note that the types of the base tactile signals belonging to the base tactile signal group may be increased or decreased, or the lengths of the base tactile signals may be adjusted according to the quality of the tactile presentation based on the tactile data to be reproduced or the throughput of the tactile presentation apparatus 13.

That is, in a case where the throughput of the tactile presentation apparatus 13 is high so that the quality of the tactile presentation based on the tactile data can be increased, the types of the base tactile signals included in the base tactile signal group may be increased, or the lengths of the base tactile signals may be shortened. In such a way, the tactile data can be divided into more types of base tactile signals, and even high-quality multi-channel tactile data can be transmitted and received at a high speed although the processing load is high. This can suppress the delay in the tactile presentation.

Conversely, in a case where the throughput of the tactile presentation apparatus 13 is low so that high-speed processing needs to be prioritized even by reducing the quality of the tactile presentation based on the tactile data, the number of base tactile signals included in the base tactile signal group may be reduced, or the lengths of the base tactile signals may be extended. In such a way, the kinds of base tactile signals to be divided can be reduced, and the processing load can be reduced. Multi-channel tactile data can be transmitted and received at a high speed even if the throughput of the tactile presentation apparatus 13 is low, and the delay in the tactile presentation can be suppressed.

Note that the tactile signal TS before encoding and the tactile signal TS' restored after encoding may be different signals in a strict sense. This is because when the input tactile signal TS is divided into the divided information DI, the tactile signal TS is divided based on a limited base tactile signal group. Even when the divided information DI is used to restore the tactile signal, a complete tactile signal TS may not be obtained. In this case, the tactile signal TS' close to the tactile signal TS is reproduced.

Therefore, in the following, in a case where the tactile signals before encoding and after encoding need to be particularly distinguished, the input tactile signal before encoding will also be referred to as an input tactile signal, and the tactile signal to be output restored after encoding will also be referred to as an output tactile signal. In addition, similarly, the tactile data corresponding to the input tactile signal will also be referred to as input tactile data, and the tactile data corresponding to the output tactile signal will also be referred to as output tactile data as necessary.

2. First Embodiment

<Configuration Example of Content Distribution System>

Next, a configuration example of a content reproduction system that reproduces content including image data, audio data, and tactile data according to the present disclosure will be described with reference to FIG. 4.

Figure 4:
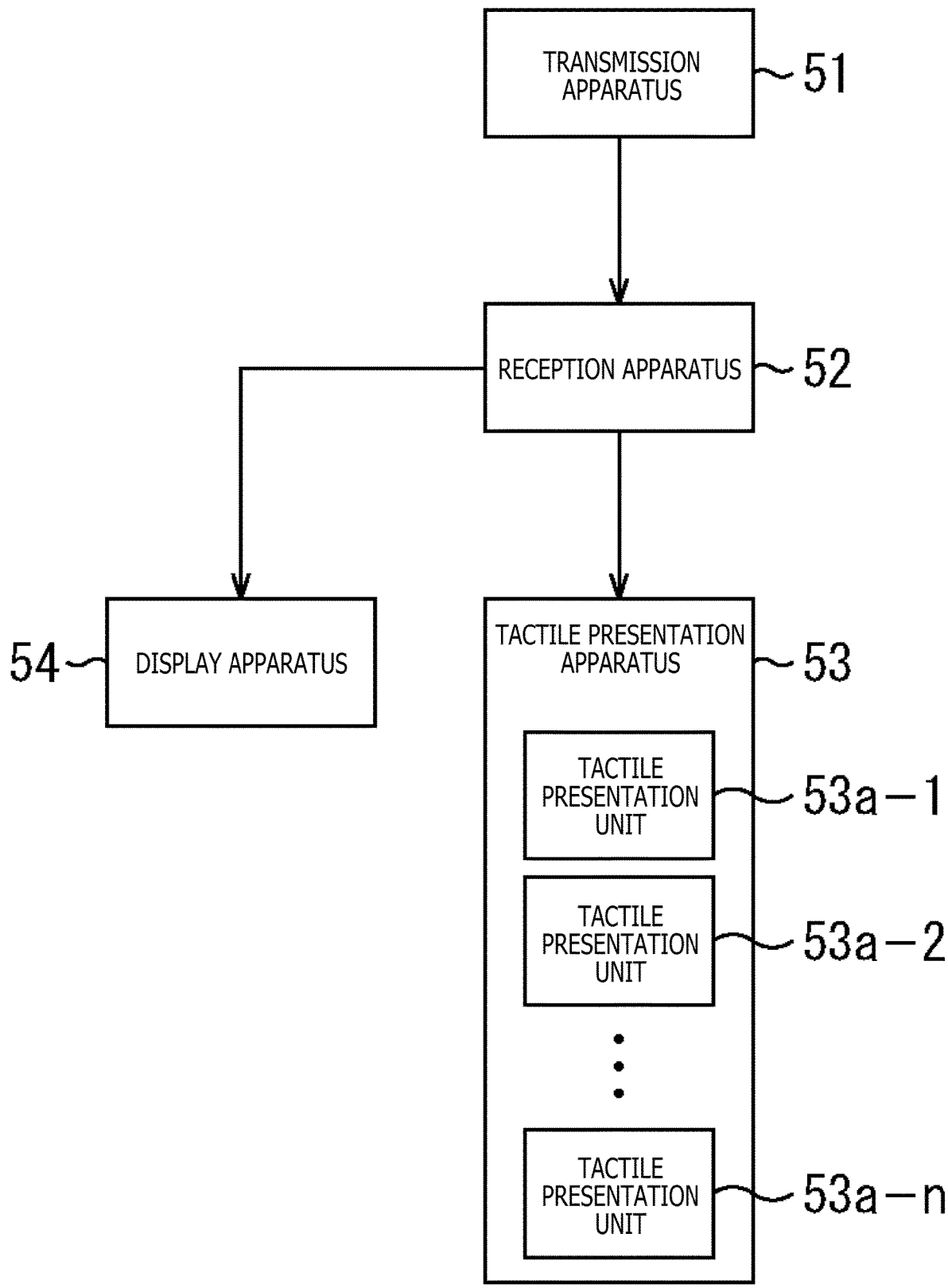
FIG. 4 is a diagram describing a configuration example of a content reproduction system according to the present disclosure.

A content reproduction system 41 of FIG. 4 includes a transmission apparatus 51, a reception apparatus 52, a tactile presentation apparatus 53, and a display apparatus 54.

The transmission apparatus 51 has a configuration corresponding to the transmission apparatus 10 in FIG. 1 and transmits the data of the content including the tactile data in addition to the image data and the audio data to the reception apparatus 52 through a network represented by a LAN (Local Area Network) based on wireless communication, wired communication, or the like.

The reception apparatus 52 has a configuration corresponding to the reception apparatus 11 in FIG. 1 and transmits the tactile data included in the content data to the tactile presentation apparatus 53 through a network represented by a LAN (Local Area Network) based on near field communication such as Bluetooth (registered trademark), wireless communication such as WiFi, wired communication, or the like. The reception apparatus 52 causes tactile presentation units 53a-1 to 53a-n including vibration units or the like to vibrate according to the tactile data to make a tactile presentation.

In addition, the reception apparatus 52 outputs the image data and the audio data included in the content data to the display apparatus 54 through wireless communication, such as WiFi, or wired communication to cause the display apparatus 54 to display the data and output the sound.

The tactile presentation apparatus 53 has, for example, a configuration corresponding to the tactile presentation apparatus 13 in FIG. 1 and includes a plurality of tactile presentation units 53a-1 to 53a-n corresponding to the vibration units 13a. The tactile presentation apparatus 53 is worn by the user, and the tactile presentation units 53a-1 to 53a-n come into contact with predetermined parts of the body of the user. Note that in the following, the tactile presentation units 53a-1 to 53a-n will be simply referred to as tactile presentation units 53a in a case where the tactile presentation units 53a-1 to 53a-n do not have to be particularly distinguished, and other components will also be similarly called.

The tactile presentation apparatus 53 causes the plurality of tactile presentation units 53a to vibrate to execute a tactile presentation at a predetermined part of the body of the user to provide a predetermined stimulus based on the tactile data supplied from the reception apparatus 52 and corresponding to the reproduction state of the content. As a result, when the user views the content reproduced by the display apparatus 54, the tactile presentation units 53a-1 to 53a-n make a tactile presentation at a predetermined part of the body according to the reproduced scene, and the user can enjoy viewing the content with a sense of reality.

Note that although the tactile presentation units 53a are vibration units that generate vibration in time series to provide a stimulus to a predetermined part of the user in the example described here, the operation may be another operation based on the tactile data, and for example, electrical muscle stimulation or pressure may be applied in time series.

The display apparatus 54 corresponds to the display apparatus 12 of FIG. 1 and is a display including an LCD (Liquid Crystal Display) or an organic EL (Electro Luminescence). In addition, the display apparatus 54 includes a speaker. The display apparatus 54 displays images based on the image data supplied from the reception apparatus 52 and outputs sound based on the audio data.

<Configuration Examples of Tactile Presentation Apparatus>

(Vest-Type Tactile Presentation Apparatus)

Figure 5:
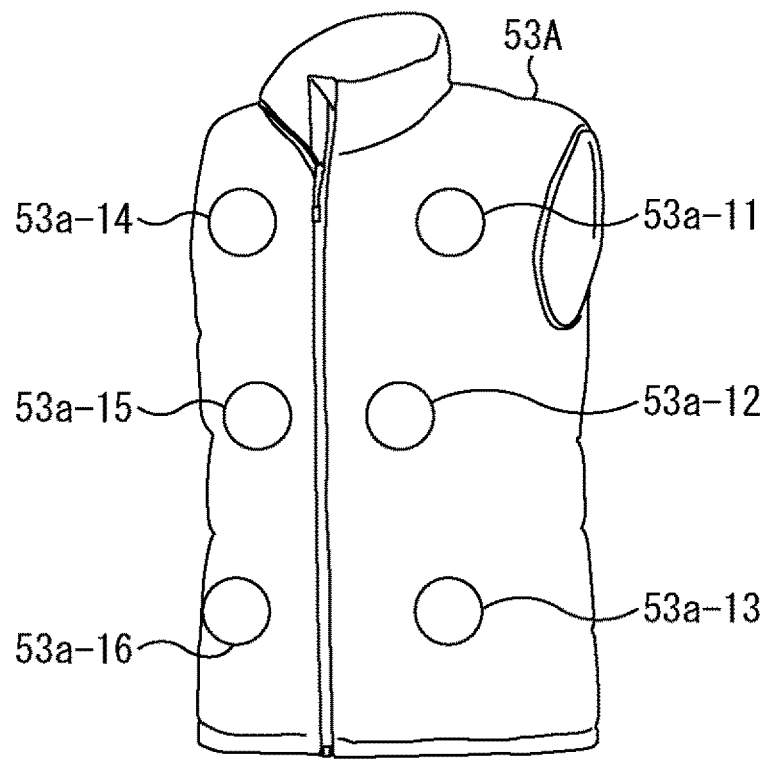
FIG. 5 is a diagram describing a configuration example of a vest-type tactile presentation apparatus.

The tactile presentation apparatus 53 may be, for example, a vest-type tactile presentation apparatus 53A as illustrated in FIG. 5.

The vest-type tactile presentation apparatus 53A of FIG. 5 is provided with tactile presentation units 53a-11 to 53a-16 that vibrate to make a tactile presentation at a part on the front side of the body of the user.

The tactile presentation units 53a-11 to 53a-16 include, for example, piezoelectric element actuators or the like and vibrate based on the tactile signal supplied from the reception apparatus 52 to make a tactile presentation to the user based on vibration stimulation.

(Wristband-Type Tactile Presentation Apparatus)

Figure 6:
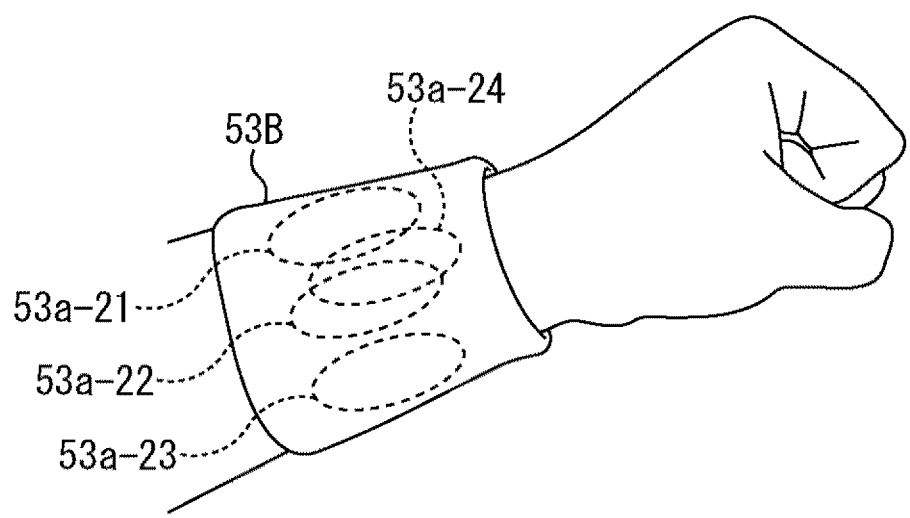
FIG. 6 is a diagram describing a configuration example of a wristband-type tactile presentation apparatus.

In addition, the tactile presentation apparatus 53 can also be, for example, a wristband-type tactile presentation apparatus 53B as illustrated in FIG. 6.

The tactile presentation apparatus 53B of FIG. 6 is installed at a part near the wrist of the user.

The tactile presentation apparatus 53B is provided with tactile presentation units 53a-21 to 53a-24 and is a wristband-type device with a function of vibrating to make a tactile presentation.

The tactile presentation apparatus 53B is provided with the tactile presentation units 53a-21 to 53a-24 that vibrate to make a tactile presentation at a part near the wrist of the user.

The tactile presentation units 53-21 to 53-24 include, for example, piezoelectric element actuators or the like and vibrate based on the supplied tactile signal to make a tactile presentation to the user based on vibration stimulation.

(Portable-Device-Type Tactile Presentation Apparatus)

Figure 7:
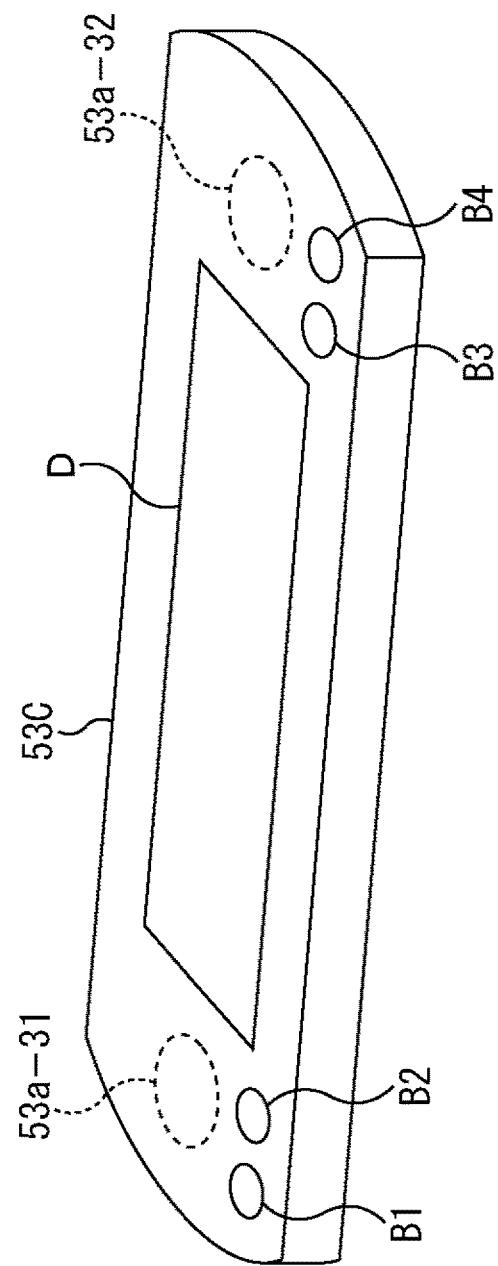
FIG. 7 is a diagram describing a configuration example of a portable-device-type tactile presentation apparatus.

Further, the tactile presentation apparatus 53 can also be, for example, a portable-device-type tactile presentation apparatus 53C, such as a game device, as illustrated in FIG. 7. In this case, the display apparatus 54 for the tactile presentation apparatus 53 may be integrated.

That is, as illustrated in FIG. 7, the tactile presentation apparatus 53C is a portable device held by the hands of the user to operate. For example, the user holds both ends of the tactile presentation apparatus 53C by hand to play a game or the like by operating buttons B1 to B4 provided on the tactile presentation apparatus 53C while viewing the images of the content displayed on a display unit D, such as a liquid crystal panel, that functions similarly to the display apparatus 54 and listening to the sound output from a speaker, a headphone, or the like not illustrated.

Tactile presentation units 53a-31 and 53a-32 that make a tactile presentation to the user according to the images of the content displayed on the display unit D and the output sound are provided at end parts inside of the tactile presentation apparatus 53C.

The tactile presentation units 53a-31 and 53a-32 include, for example, piezoelectric element actuators or the like and vibrate based on the tactile data supplied from the reception apparatus 52 to make a tactile presentation to the user based on vibration stimulation. Note that in the examples illustrated in FIGS. 5 to 7, the tactile presentation apparatus 53 may be a tactile presentation apparatus 53 that makes a tactile presentation of a category different from the vibration stimulation.

<Configuration Example of Transmission Apparatus>

Next, a configuration example of the transmission apparatus 51 will be described with reference to FIG. 8.

The transmission apparatus 51 includes a control unit 71, a communication unit 72, a storage unit 73, an input unit 74, an output unit 75, a drive 76, and a removable storage medium 77 that are connected to each other through a bus 78 so that data and programs can be transmitted and received.

The control unit 71 includes a processor and a memory and controls the entire operation of the transmission apparatus 51. The control unit 71 includes a content processing unit 91 and a tactile data processing unit 92.

The content processing unit 91 reads content data including image data, audio data, and tactile data stored in the storage unit 73 and controls the communication unit 72 to transmit the content data to the reception apparatus 52. In this case, the content processing unit 91 supplies the tactile data to the tactile data processing unit 92 to cause the tactile data processing unit 92 to convert the tactile data into encoded data and then causes the tactile data processing unit 92 to transmit the converted encoded data to the reception apparatus 52 along with the image data and the audio data.

The tactile data processing unit 92 includes an encoding unit 101. The tactile data processing unit 92 causes the encoding unit 101 to use the tactile data in the content data supplied from the content processing unit 91 as input tactile data to convert the input tactile data into encoded data and outputs the encoded data to the content processing unit 91. Note that the encoding method of the tactile data executed by the encoding unit 101 will be described in detail later with reference to FIGS. 10 and 11.

The communication unit 72 is controlled by the control unit 71 and uses wired (or wireless (not illustrated)) communication to transmit and receive various data and programs to and from the reception apparatus 52 through a communication network represented by a LAN (Local Area Network) or the like.

The storage unit 73 is controlled by the control unit 71 and includes an HDD (Hard Disk Drive), an SSD (Solid State Drive), a semiconductor memory, or the like. The storage unit 73 writes or reads various data including the content data and programs.

The input unit 74 includes an input device, such as a keyboard and a mouse, for the user to input an operation command and supplies various input signals to the control unit 71.

The output unit 75 is controlled by the control unit 71 and outputs and displays a supplied processing operation screen or an image of a processing result on a display device not illustrated.

The drive 76 reads and writes data to and from the removable storage medium 77, such as a magnetic disk (including a flexible disk), an optical disk (including a CD-ROM (Compact Disc-Read Only Memory) and a DVD (Digital Versatile Disc)), a magneto-optical disk (including an MD (Mini Disc)), and a semiconductor memory.

<Configuration Example of Reception Apparatus>

Next, a configuration example of the reception apparatus 52 will be described with reference to FIG. 9.

The reception apparatus 52 includes a control unit 131, a communication unit 132, a storage unit 133, an input unit 134, an output unit 135, a drive 136, and a removable storage medium 137 that are connected to each other through a bus 138 so that data and programs can be transmitted and received.

The control unit 131 includes a processor and a memory and controls the entire operation of the reception apparatus 52. The control unit 131 includes a content processing unit 151 and a tactile data processing unit 152.

The content processing unit 151 acquires the content data including the encoded data of encoded image data, audio data, and input tactile data supplied from the transmission apparatus 51 through the communication unit 132. Further, the content processing unit 151 controls the communication unit 132 to output the image data and the audio data to the display apparatus 54 to cause the display apparatus 54 to display images and output sound. In addition, the content processing unit 151 supplies the encoded data to the tactile data processing unit 152 and causes the tactile data processing unit 152 to restore the data as output tactile data. The content processing unit 151 then supplies the output tactile data to the tactile presentation apparatus 53 and causes the tactile presentation units 53a to make a tactile presentation based on the output tactile data.

The tactile data processing unit 152 includes a decoding unit 161. The tactile data processing unit 152 causes the decoding unit 161 to decode the encoded data supplied from the content processing unit 151 to restore the data as output tactile data corresponding to the input tactile data as original tactile data and outputs the output tactile data to the content processing unit 151. Note that the restoration method of the output tactile data from the encoded data executed by the decoding unit 161 will be described in detail later with reference to FIGS. 10 and 11.

The communication unit 132 is controlled by the control unit 131 and uses wired (or wireless (not illustrated)) communication to transmit and receive various data and programs to and from the transmission apparatus 51 through a communication network represented by a LAN (Local Area Network) or the like.

The storage unit 133 is controlled by the control unit 131 and includes an HDD (Hard Disk Drive), an SSD (Solid State Drive), a semiconductor memory, or the like. The storage unit 133 writes or reads various data including the content data and programs. In addition, the information of the base tactile signal group necessary for the decoding unit 161 to decode the encoded data is stored in the storage unit 133.

The input unit 134 includes an input device, such as a keyboard and a mouse, for the user to input an operation command and supplies various input signals to the control unit 131.

The output unit 135 is controlled by the control unit 131 and outputs and displays a supplied processing operation screen or an image of a processing result on a display device not illustrated.

The drive 136 reads and writes data to and from the removable storage medium 137, such as a magnetic disk (including a flexible disk), an optical disk (including a CD-ROM (Compact Disc-Read Only Memory) and a DVD (Digital Versatile Disc)), a magneto-optical disk (including an MD (Mini Disc)), and a semiconductor memory.

<Encoding Method and Decoding Method of Tactile Data>

Next, the encoding method and the decoding method of the tactile data will be described with reference to FIG. 10.

Figure 10:
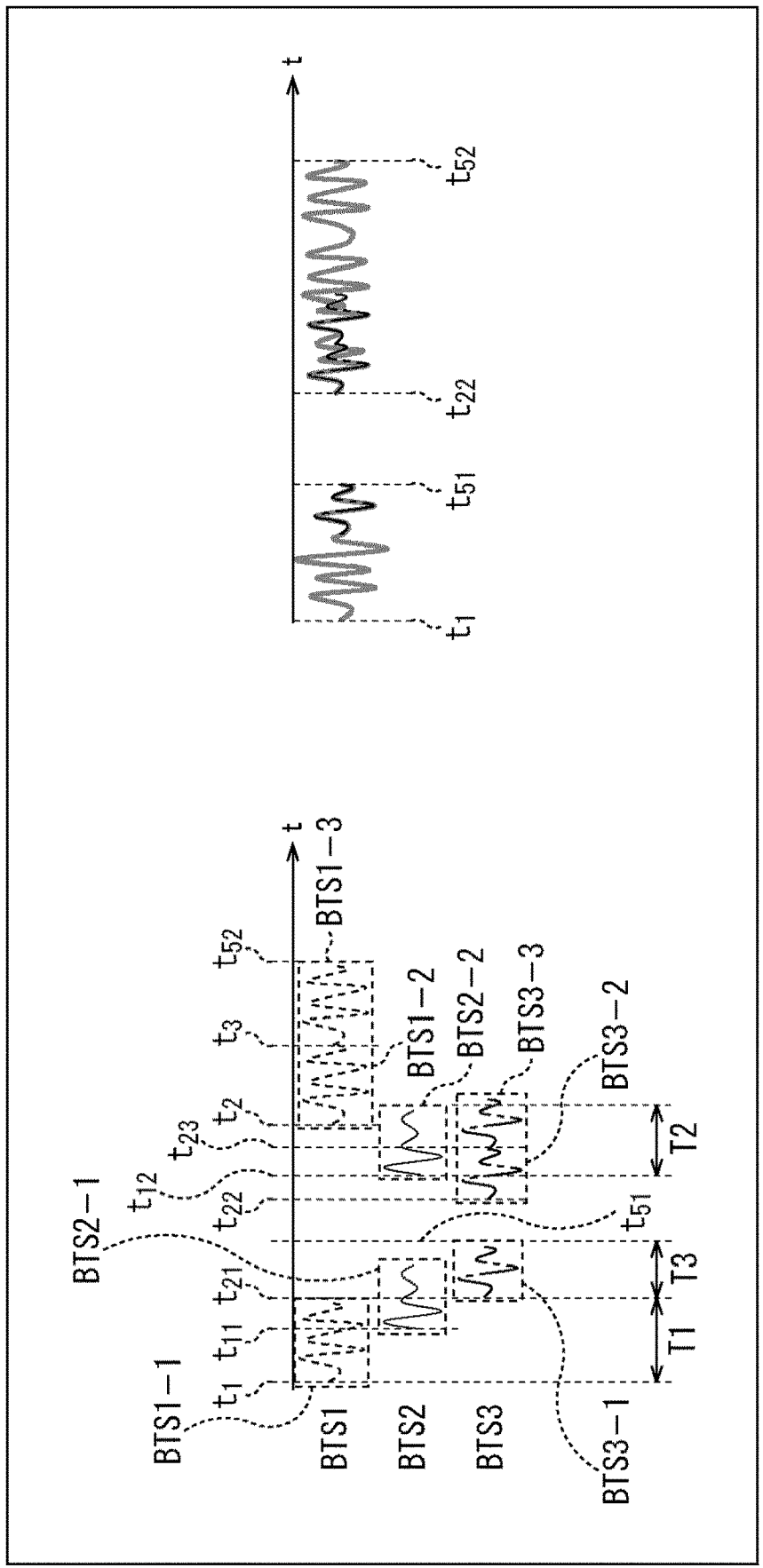
FIG. 10 is a diagram describing an encoding process and an decoding process of the tactile data.

In a case considered here, an input tactile signal based on input tactile data for vibrating one tactile presentation unit 53a is, for example, an input tactile signal with a vibration waveform as illustrated on the right side of FIG. 10.

The encoding unit 101 performs frequency analysis, pattern matching, or the like to divide the input tactile signal as illustrated on the right side of FIG. 10 into a plurality of base tactile signals belonging to a base tactile signal group as illustrated on the left side of FIG. 10 to generate divided information.

On the left side of FIG. 10, the input tactile signal is divided into three types of base tactile signals BTS1 to BTS3, and the offset (time code) of each is obtained.

More specifically, the waveform from time t1 to t51 on the right side of FIG. 10 is divided into base tactile signals BTS1-1, BTS2-1, and BTS3-1 on the left side of FIG. 10, and the waveform from time t22 to t52 on the right side of FIG. 10 is divided into base tactile signals BTS3-2, BTS3-3, BTS2-2, BTS1-2, and BTS1-3 on the left side of FIG. 10.

That is, as for the base tactile signal BTS1, the offset (time code) timing of each time from time t1 to t3 is the start timing of each of the base tactile signals BTS1-1 to BTS1-3.

In addition, as for the base tactile signal BTS2, the offset (time code) timing of each of time t11 and time t12 is the start timing of each of the base tactile signals BTS2-1 and BTS2-2.

Further, as for the base tactile signal BTS3, the start timing of each of the base tactile signals BTS3-1 to BTS3-3 is at the offset timing of each time from time t21 to t23.

The encoding unit 101 generates the encoded data based on the division results as obtained on the left side of FIG. 10.

That is, the encoding unit 101 encodes the parameters regarding the base tactile signal including, for example, the information of the base tactile signal index for identifying the base tactile signal, the offset (time code) of each base tactile signal, and the length based on the division results as obtained in the left side of FIG. 10.

Here, for the base tactile signal index, the encoding unit 101 uses a parameter of one of 1, 2, or 3 corresponding to the base tactile signals because there are three types of base tactile signals BTS1 to BTS3.

In addition, the offset (time code) is one of time t1 to t3, t11, t12, t21, t22, or t23 in the case on the left side of FIG. 10, and the encoding unit 101 uses the time code indicating the corresponding offset as a parameter.

Further, the base tactile signals BTS1 to BTS3 have predetermined lengths T1 to T3, respectively, and the encoding unit 101 uses this information as a parameter.

As a result, on the left side of FIG. 10, the encoding unit 101 encodes, for example, the base tactile signal BTS1-1 as (base tactile signal index, time code indicating offset of base tactile signal, and length)=(1, t1, T1).

Similarly, the encoding unit 101 encodes the base tactile signals BTS1-2 and BTS1-3 as (base tactile signal index, time code indicating offset timing of base tactile signal, and length)=(1, t2, T1), (1, t3, T1), respectively.

In addition, the base tactile signals BTS2-1 and BTS2-2 are encoded as (base tactile signal index, time code indicating offset of base tactile signal, and length)=(2, t1*l*, T2), (2, t12, T2), respectively.

Further, the base tactile signals BTS3-1 to BTS3-3 are encoded as (base tactile signal index, time code indicating offset of base tactile signal, and length)=(3, t21, T3), (3, t22, T3), (3, t23, T3), respectively.

Further, the encoding unit 101 adds and combines the encoding results obtained for the base tactile signals to generate the encoded data of the input tactile signal corresponding to the input tactile data. That is, the divided information of the input tactile signal as illustrated on the left side of FIG. 10 is used to combine the encoding results of the plurality of base tactile signals, such as, for example, (1, t1, T1), (1, t2, T1), (1, t3, T1), (2, t11, T2), (2, t12, T2), (3, t21, T3), and (3, t22, T3), and the encoded data of the input tactile signal is generated.

As a result of the series of processes, the input tactile signal corresponding to the input tactile data is converted into the encoded data.

On the other hand, the decoding unit 161 executes a process opposite the process of converting the input tactile data into the encoded data to convert the encoded data into the output tactile data.

That is, once the decoding unit 161 is supplied with the encoded data (1, t1, T1), (1, t2, T1), (1, t3, T1), (2, t1*l*, T2), (2, t12, T2), (3, t21, T3), (3, t22, T3) generated as described above, the decoding unit 161 breaks up the plurality of pieces of combined encoded data to restore each base tactile signal.

That is, for example, (1, t1, T1) indicates that the base tactile signal index is 1, the time code indicating the offset timing of the base tactile signal is t1, and the length is T1. Therefore, the decoding unit 161 reads the base tactile signal with the base tactile signal index of 1 in the base tactile signal group stored in the storage unit 133 and applies a process corresponding to offset=t1 to restore the base tactile signal BTS1-1 on the left side of FIG. 10.

Similarly, the decoding unit 161 restores the base tactile signals BTS1-2, BTS1-3, BTS2-1, BTS2-2, BTS3-1, BTS3-2, and BTS3-3 as output tactile signals with signal waveforms as illustrated on the left side of FIG. 10 based on the encoded data (1, t2, T1), (1, t3, T1), (2, t1*l*, T2), (2, t12, T2), (3, t21, T3), (3, t22, T3), and (3, t23, T3), respectively.

Further, the decoding unit 161 adds and combines the signal waveforms of the restoration results obtained as on the left side of FIG. 10 to restore the final signal waveforms of the output tactile signals as illustrated on the right side of FIG. 10 to generate the corresponding output tactile data. More specifically, the base tactile signals BTS1-1, BTS2-1, and BTS3-1 illustrated on the left side of FIG. 10 are added to restore the output tactile signal with the waveform as illustrated from time t1 to t51 on the right side of FIG. 10. In addition, the base tactile signals BTS3-2, BTS3-3, BTS2-2, BTS1-2, and BTS1-3 illustrated on the left side of FIG. 10 are added to restore the output tactile signal with the waveform as illustrated from time t22 to t52 on the right side of FIG. 10.

As a result of the encoding process and the decoding process, only the parameters of each of a predetermined number of base tactile signals need to be used to express the tactile data. Therefore, the tactile data can more efficiently be compressed compared to the existing tactile data in which the waveforms of the tactile signals based on the tactile data are digitalized point by associating the time and the waveform values in time series.

Therefore, even when the tactile data of multiple channels is transmitted and received, the tactile data can efficiently be transmitted and received, and the time required for the transmission and the reception can be shortened.

As a result, even when the tactile data of multiple channels is transmitted and received, the time required for the transmission and the reception can be reduced. Therefore, the generation of the delay regarding the tactile presentation can be suppressed even when the tactile data of multiple channels is transmitted and received, and the tactile presentation can be made in synchronization with the images and the audio content.

<Addition of Parameters in Encoded Data>

Although the base tactile signal index, the time code indicating the offset of the base tactile signal, and the length are used as the parameters of the encoded data in the description above, parameters for arranging the base tactile signal may be further added.

For example, changes in gain in a period of time defined by the length of the base tactile signal may be expressed by various envelopes, and a parameter including the type of envelope as an index may be set.

In addition, for example, certain changes in gain in the entire period of time defined by the length of the base tactile signal may be set as a parameter.

Figure 11:
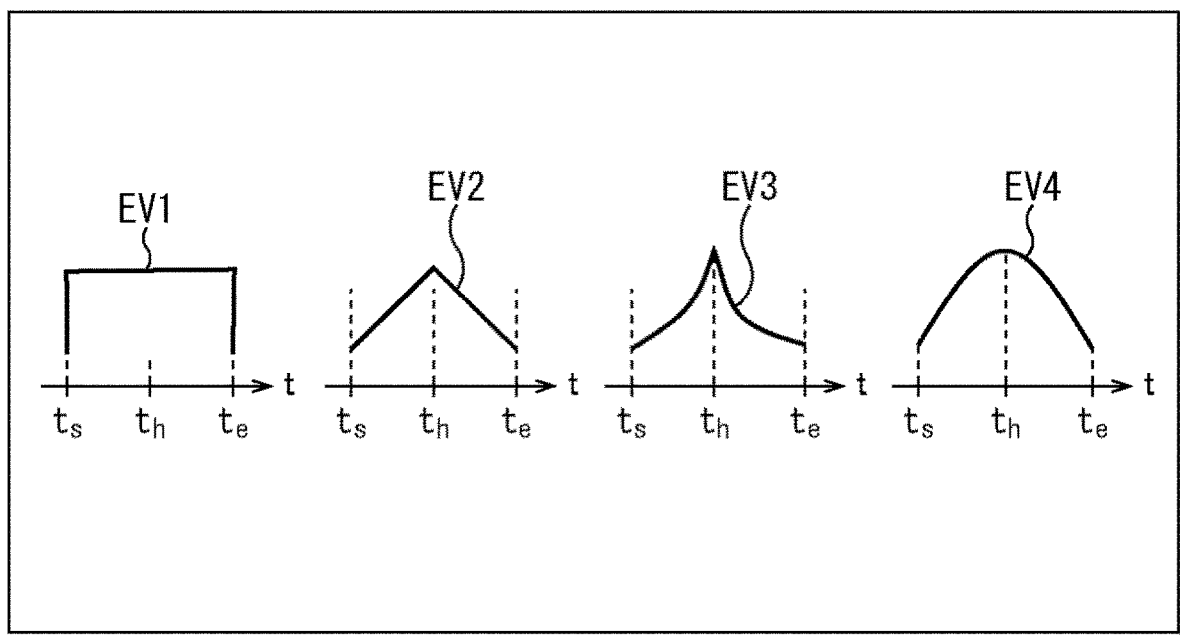
FIG. 11 is a diagram describing an encoding process and a decoding process of the tactile data.

That is, the envelopes expressing the changes in gain in the period of time defined by the length of the base tactile signal are, for example, envelopes EV1 to EV4 as illustrated on the left side of FIG. 11.

The envelope EV1 expresses that the gain is zero at time ts and te in the period of time from time ts to te determined by the length of the base tactile signal, and a certain gain is maintained for the base tactile signal between time ts and te.

The envelope EV2 expresses that the gain rises at a certain rate before intermediate time th, and the gain falls at a certain rate after intermediate time th in the period of time from time ts to te determined by the length of the base tactile signal.

The envelope EV3 expresses that the gain rises with a downward projecting waveform change before intermediate time th, and the gain falls with a downward projecting waveform change after intermediate time th in the period of time from time ts to te determined by the length of the base tactile signal.

The envelope EV4 expresses that the gain rises with an upward projecting waveform change before intermediate time th, and the gain falls with an upward projecting waveform change after intermediate time th in the period of time from time ts to te determined by the length of the base tactile signal.

The envelopes can be set in such a way to define fade-in and fade-out of the base tactile signals, and the proportions of the overlapping parts between the base tactile signals can appropriately be expressed.

Figure 12:
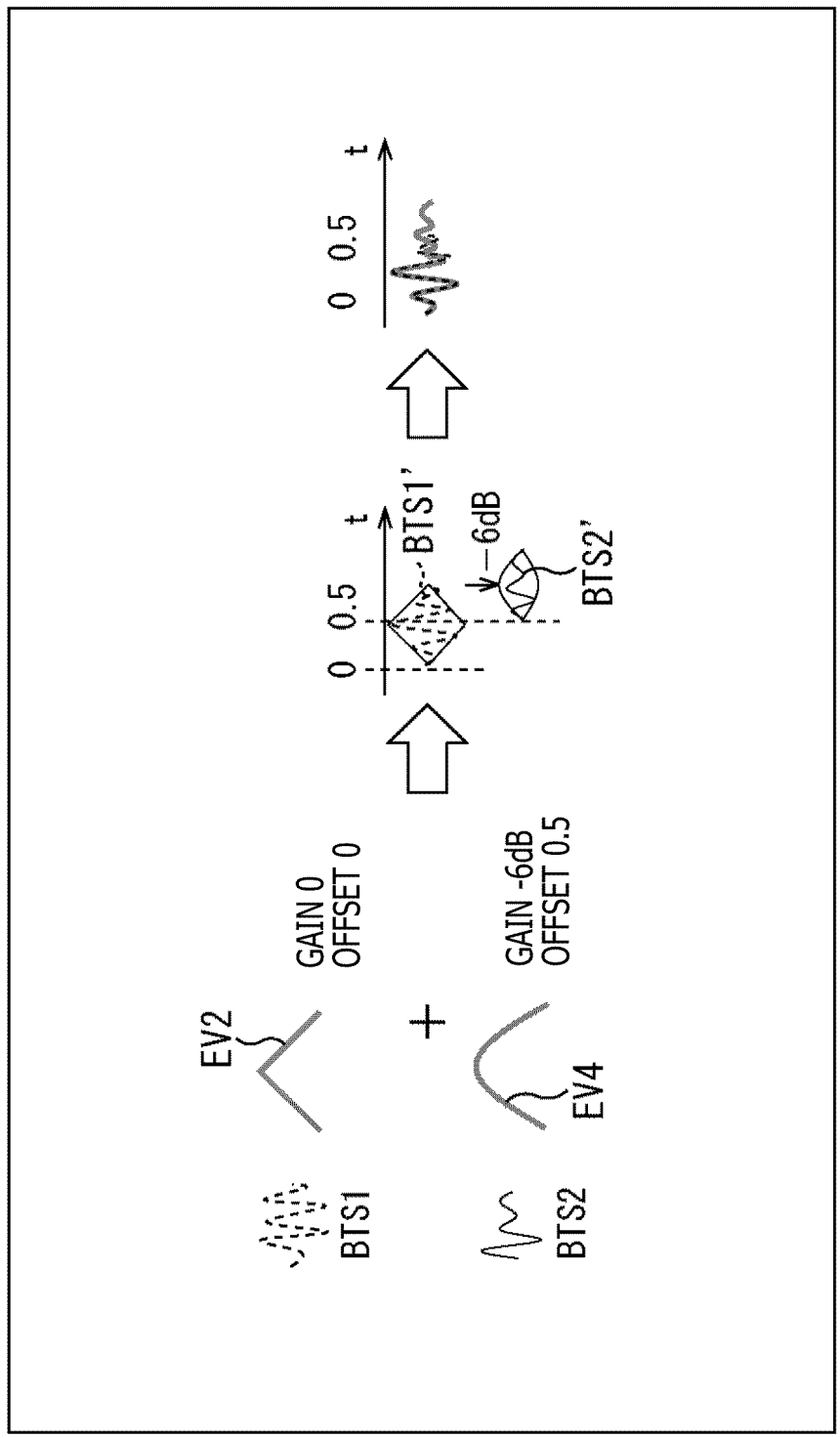
FIG. 12 is a diagram describing an encoding process and a decoding process of the tactile data.

For example, in a case where the envelope EV2 is applied to the base tactile signal BTS1, the gain in the entire time zone is 0, and the time code as an offset is 0 as illustrated in the upper left part of FIG. 12, the envelope EV2 changes the entire waveform of the base tactile signal BTS1 into a triangular shape projection in the up-down direction, and a base tactile signal BTS1' indicated by the waveform in the center part of FIG. 12 is obtained.

Further, in a case where, for example, the envelope EV4 is applied to the base tactile signal BTS2, the gain in the entire time zone is −6 dB, and the time code as an offset is 0.5 as illustrated in the lower left part of FIG. 12, the envelope EV4 changes the entire waveform of the base tactile signal BTS2 into a curve shape projection in the up-down direction, and the wave height of the waveform is reduced as a whole. Further, the waveform is offset by 0.5 in the time direction, and a base tactile signal BTS2' indicated by the waveform in the center part of FIG. 12 is obtained.

The base tactile signal BTS1' and the base tactile signal BTS2' in the center part of FIG. 12 are combined to obtain a combined waveform as illustrated on the right side of FIG. 12.

Therefore, the parameters defining the gain and the envelope can be used to broaden the variation of the tactile signals expressed by combining the limited base tactile signals, and a more delicate tactile presentation can be made.

Note that in the encoding of the tactile data corresponding to the tactile signal in the following description, the parameters including the base tactile signal index, the time code (indicating the offset timing of the base tactile signal), the gain, the length, and the envelope index of each base tactile signal will be used as the encoded data.

<Expression of Tactile Signals of Multiple Channels>

Although the encoded data for the tactile data of one tactile presentation unit 53*a* has been described above, there is a plurality of tactile presentation units 53*a* in reality, and the encoded data is obtained in one channel for each of the plurality of tactile presentation units 53*a*.

That is, in the case where n tactile presentation units 53*a*-1 to 53*a*-*n* are provided, the encoded data corresponding to n channels is obtained as illustrated in FIG. 13.

In FIG. 13, the encoded data of tactile presentation unit 1*ch* is described as the encoded data of the tactile presentation unit 53*a*-1 in the top stage, and (base tactile signal index 1, time code, gain, length, envelope index), . . . , (base tactile signal index 2, time code, gain, length, envelope index), . . . , (base tactile signal index 3, time code, gain, length, envelope index), and (base tactile signal index m, time code, gain, length, envelope index) are set.

In addition, the encoded data of tactile presentation unit 2*ch* is described as the encoded data of the tactile presentation unit 53*a*-2 in the second stage, and (base tactile signal index 1, time code, gain, length, envelope index), . . . , (base tactile signal index 2, time code, gain, length, envelope index), . . . , (base tactile signal index 3, time code, gain, length, envelope index), . . . , and (base tactile signal index m, time code, gain, length, envelope index) are set.

Further, the encoded data of tactile presentation unit 1*ch* is described as the encoded data of the tactile presentation unit 53*a*-*n* in the nth stage, and (base tactile signal index 1, time code, gain, length, envelope index), . . . , (base tactile signal index 2, time code, gain, length, envelope index), . . . , (base tactile signal index 3, time code, gain, length, envelope index), . . . , and (base tactile signal index m, time code, gain, length, envelope index) are set.

That is, the encoded data of each of the base tactile signal indices 1 to m is set for each channel of each tactile presentation unit 53a.

Further, in a case where the parameters of the encoded data are the same as in another channel, information indicating that the parameters are the same as in another channel may be provided without describing the parameters.

That is, in a case where, for example, the time code of the base tactile signal index 2 in the tactile presentation unit 2ch is the same as the time code of the base tactile signal index 1, (base tactile signal index 2, 1ch, gain, 1ch (tx to ty), envelope index) may be described as illustrated in FIG. 14 to express that the information of the time code is the same as in the tactile presentation unit 1ch, the length of the base tactile signal is the same as in 1ch, and the same range is a range of time tx to ty.

Further, in a case where the gain of the base tactile signal index m is 5 dB higher than the gain in the tactile presentation unit 1ch, (base tactile signal index m, time code, 1ch+5, length, envelope index) may be described as illustrated in FIG. 14 to express that the gain is 5 dB higher than the gain in the tactile presentation unit 1ch.

Further, tactile presentation reference signs as standards may be set from the encoded data of the tactile presentation units 53a-1 to 53a-n, and differences from the tactile presentation reference signs may be set as the encoded data of each channel.

Figure 15:
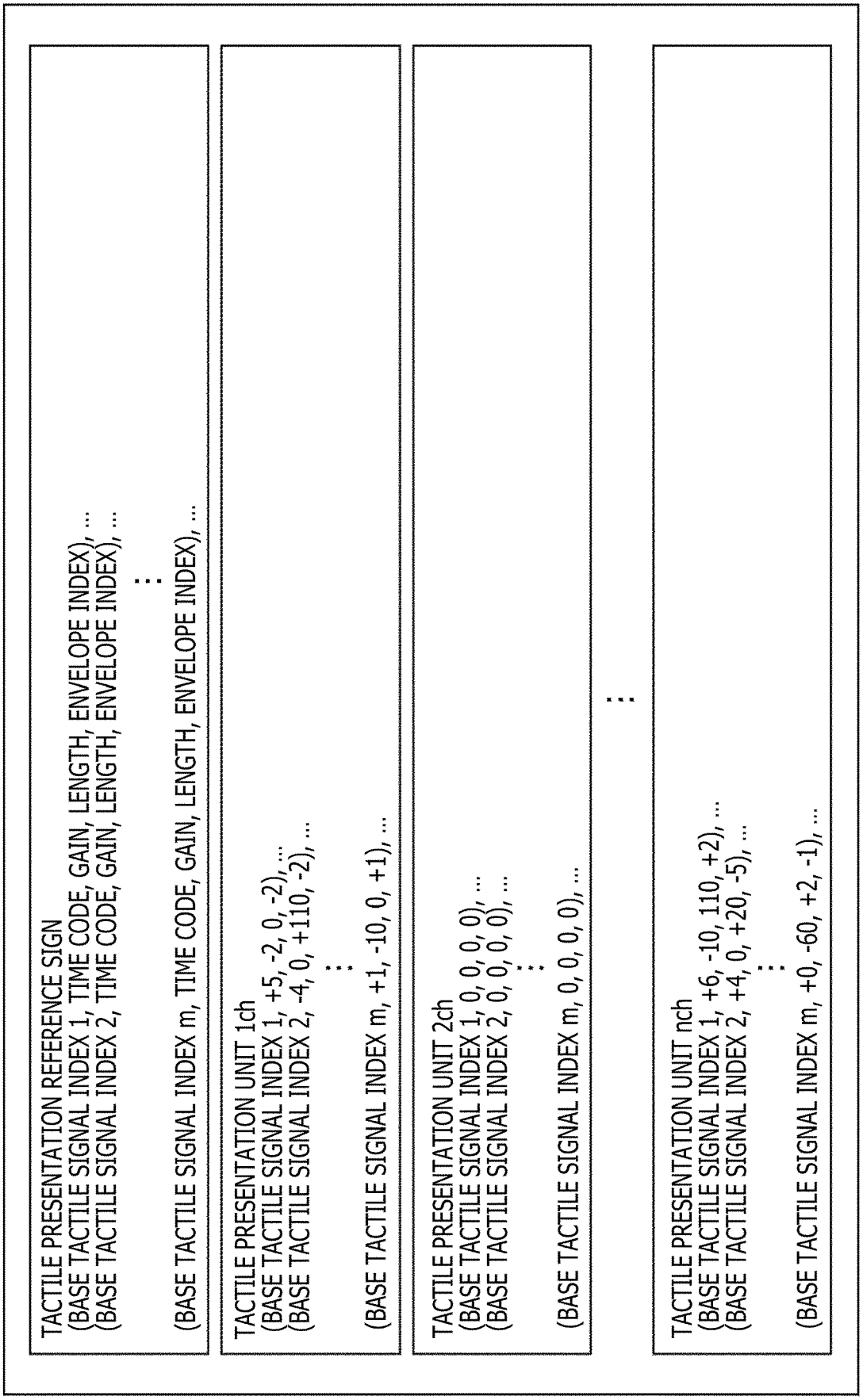
FIG. 15 is a diagram describing an expression method of the encoded data of multiple channels.

The tactile presentation reference signs include, for example, the encoded data of (base tactile signal index 1, time code, gain, length, envelope index), . . . , (base tactile signal index 2, time code, gain, length, envelope index), . . . , (base tactile signal index 3, time code, gain, length, envelope index), . . . , and (base tactile signal index m, time code, gain, length, envelope index) as illustrated in the top stage of FIG. 15. The encoded data may include, for example, values, such as average values, minimum values, and maximum values of the parameters of the encoded data of the tactile presentation units 53a-1 to 53a-n.

Further, the differences are set for the encoded data of the tactile presentation unit 53a of each channel.

That is, the encoded data of the tactile presentation unit 53a-1 indicated in the tactile presentation unit 1ch includes encoded data of (base tactile signal index 1, +5, −2, 0, −2), . . . , (base tactile signal index 2, −4, 0, +110, −2), . . . , and (base tactile signal index m, +1, −10, 0, +1) as illustrated in the second stage from the top of FIG. 15.

In this case, the encoded data of the tactile presentation unit 53a-1 indicated in the tactile presentation unit 1ch indicates that the time code of the encoded data of the base tactile signal index 1 is +5 ms from the tactile presentation reference sign, the gain is −2 dB from the tactile presentation reference sign, the length is the same as the tactile presentation reference sign, and the envelope index is −2 from the tactile presentation reference sign.

In addition, the encoded data of the base tactile signal index 2 indicates that the time code is −4 ms from the tactile presentation reference sign, the gain is the same as the tactile presentation reference sign, the length is +110 ms from the tactile presentation reference sign, and the envelope index is −2 from the tactile presentation reference sign.

Further, the encoded data of the base tactile signal index m indicates that the time code is +1 ms from the tactile presentation reference sign, the gain is −10 dB from the tactile presentation reference sign, the length is the same as the tactile presentation reference sign, and the envelope index is +1 from the tactile presentation reference sign.

In addition, as illustrated in the third stage from the top of FIG. 15, the encoded data of the tactile presentation unit 53a-1 indicated in the tactile presentation unit 2ch indicates that the encoded data is the same as the tactile presentation reference signs because all of the signs are 0.

Further, the encoded data of the tactile presentation unit 53a-n indicated in the tactile presentation unit nch includes encoded data of (base tactile signal index 1, +6, −10, 110, +2), . . . , (base tactile signal index 2, +4, 0, +20, −5), . . . , and (base tactile signal index m, 0, −60, +2, −1) as illustrated in the bottom stage of FIG. 15.

In this case, the encoded data of the tactile presentation unit 53a-n indicated in the tactile presentation unit nch indicates that the time code of the encoded data of the base tactile signal index 1 is +6 ms from the tactile presentation reference sign, the gain is −10 dB from the tactile presentation reference sign, the length is +110 ms from the tactile presentation reference sign, and the envelope index is +2 from the tactile presentation reference sign.

In addition, the encoded data of the base tactile signal index 2 indicates that the time code is +4 ms from the tactile presentation reference sign, the gain is the same as the tactile presentation reference sign, the length is +20 ms from the tactile presentation reference sign, and the envelope index is −5 from the tactile presentation reference sign.

Further, the encoded data of the base tactile signal index m indicates that the time code is the same as the tactile presentation reference sign, the gain is −60 dB from the tactile presentation reference sign, the length is +2 ms from the tactile presentation reference sign, and the envelope index is −1 from the tactile presentation reference sign.

In any case, the encoded data includes only the difference information. Therefore, the encoded data can more efficiently be compressed, and the communication speed of the encoded data can be improved. Further, in the case where all of the encoded data is the same as the tactile presentation reference signs as in the encoded data of the base tactile signal index 2 in FIG. 15, one sign may be used to express that all of the encoded data of the base tactile signal index 2 is the same as the tactile presentation reference signs.

<Reproduction Process>

Next, a reproduction process of the content executed by the content reproduction system of FIG. 4 will be described with reference to a flow chart of FIG. 16.

In step S11, the content processing unit 91 reads the content data including the image data, the audio data, and the tactile data (input tactile data) stored in the storage unit 73.

In step S12, the content processing unit 91 extracts the image data, the audio data, and the tactile data (input tactile data) from the read content data.

In step S13, the tactile data processing unit 92 executes a tactile data encoding process to convert the tactile data (input tactile data) into encoded data.

<Tactile Data Encoding Process>

Figure 17:
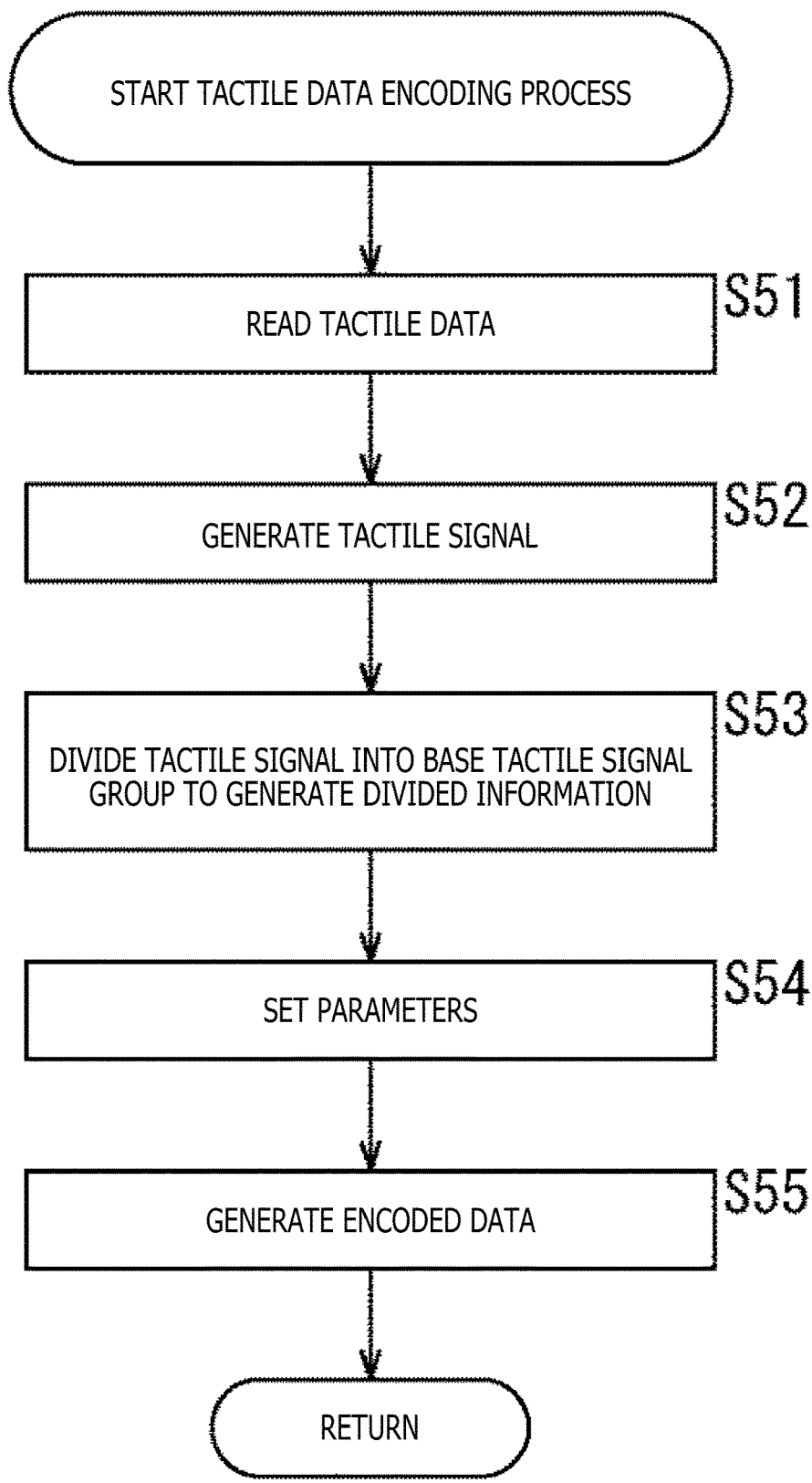
FIG. 17 is a flow chart describing a tactile data encoding process.

Here, the tactile data encoding process will be described with reference to a flow chart of FIG. 17.

In step S51, the tactile data processing unit 92 in the control unit 71 of the transmission apparatus 51 reads the tactile data (input tactile data) extracted by the content processing unit 91 from the content data.

In step S52, the encoding unit 101 generates the tactile signal (input tactile signal) based on the tactile data (input tactile data). Here, the tactile signal has, for example, the signal waveform as illustrated on the right side of FIG. 10.

In step S53, the encoding unit 101 applies frequency analysis or pattern matching to divide the tactile signal (input tactile signal) with the signal waveform into the base tactile signal group and generates the divided information. That is, in the case of, for example, the tactile signal with the signal waveform as illustrated on the right side of FIG. 10, the encoding unit 101 generates the divided information including the base tactile signal group as illustrated on the left side of FIG. 10.

In step S54, the encoding unit 101 sets parameters for each base tactile signal group based on the divided information. More specifically, the encoding unit 101 sets the parameters corresponding to the base tactile signal index, the time code, the gain, the length, and the envelope index for each base tactile signal group based on the divided information as illustrated on the left side of FIG. 10.

In step S55, the encoding unit 101 encodes the parameters set for each base tactile signal group that are divided information and outputs, as encoded data, the combined information obtained by combining the parameters.

Figure 16:
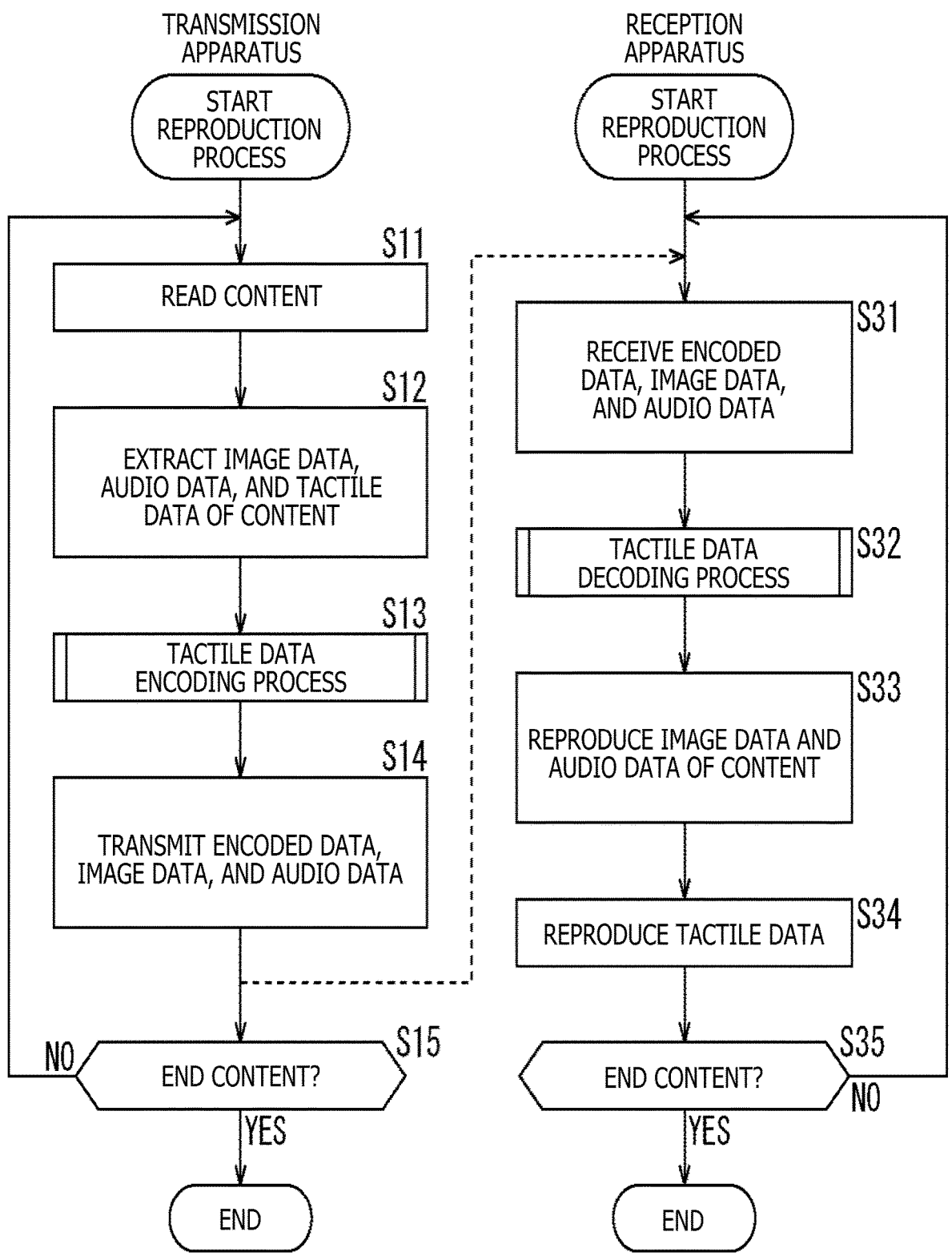
FIG. 16 is a flow chart describing a reproduction process.

Here, the flow chart of FIG. 16 will be further described.

In step S14, the content processing unit 91 controls the communication unit 72 to transmit the content data including the image data and the audio data in addition to the encoded data to the reception apparatus 52.

In step S31, the content processing unit 151 in the control unit 131 of the reception apparatus 52 controls the communication unit 132 to receive the content data including the image data and the audio data in addition to the encoded data transmitted from the transmission apparatus 51.

In step S32, the tactile data processing unit 152 executes a tactile data decoding process to decode the encoded data in the content data received by the content processing unit 151 into tactile data (output tactile data).

<Tactile Data Decoding Process>

Figure 18:
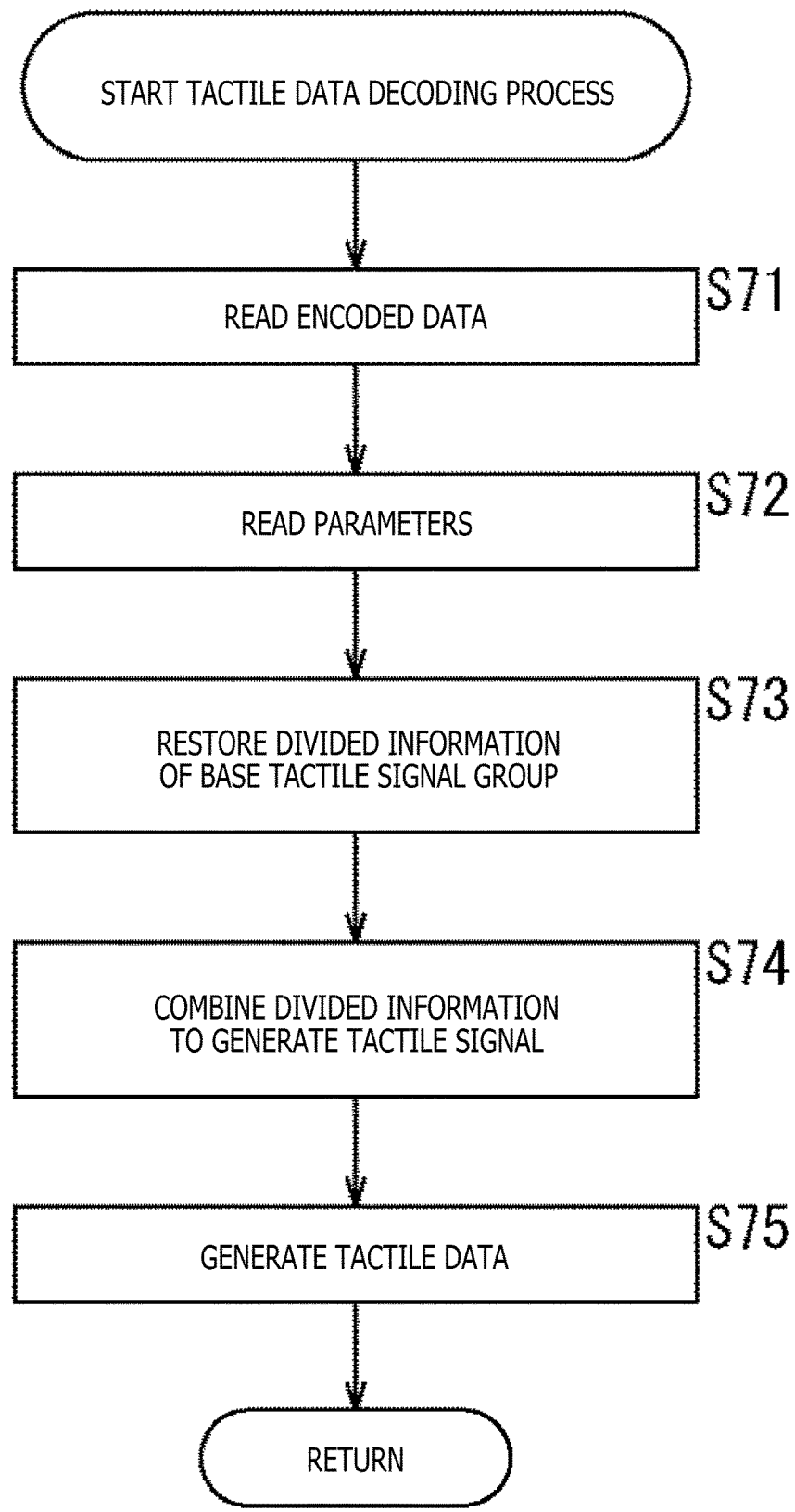
FIG. 18 is a flow chart describing a tactile data decoding process.

Here, the tactile data decoding process will be described with reference to a flow chart of FIG. 18.

In step S71, the tactile data processing unit 152 reads the encoded data in the content data received by the content processing unit 151.

In step S72, the decoding unit 161 reads the parameters set for each base tactile encoding group based on the encoded data.

In step S73, the decoding unit 161 restores the divided information set for each base tactile encoding group based on the read parameters. That is, the decoding unit 161 restores the divided information including the base tactile signal group as illustrated on the left side of FIG. 10 based on the parameters of each of the base tactile signal index, the time code, the gain, the length, and the envelope index. That is, the decoding unit 161 reads the base tactile signals corresponding to the base tactile signal index from the storage unit 133 and restores the divided information of each base tactile signal by applying a process based on the parameters of each of the time code, the gain, the length, and the envelope index.

In step S74, the decoding unit 161 combines the divided information to restore the tactile signal (as output tactile signal). That is, the decoding unit 161 restores the tactile signal (as output tactile signal) as illustrated on the right side of FIG. 10 based on the divided information including the base tactile signal group as illustrated on the left side of FIG. 10.

In step S75, the decoding unit 161 generates the tactile data (output tactile data) based on the tactile signal (output tactile signal).

Here, the flow chart of FIG. 16 will be further described.

In step S33, the content processing unit 151 outputs the image data and the audio data to the display apparatus 54 and causes the display apparatus 54 to display the images of the content and output the sound to thereby reproduce the content.

In step S34, the content processing unit 151 supplies the decoded tactile data (output tactile data) to the tactile presentation apparatus 53 and causes each of the tactile presentation units 53a to vibrate to reproduce the tactile data (make a tactile presentation).

Note that in this case, the content processing unit 151 uses timing control information independent from each other to manage and execute the timing of the process of supplying the transmitted image data and audio data to the display apparatus 54 to cause the display apparatus 54 to reproduce the content and the process of supplying the tactile data (output tactile data) to the tactile presentation apparatus 53 to cause the tactile presentation apparatus 53 to make the tactile presentation.

In addition, whether or not the end is instructed is determined in steps S15 and S35. In a case where the end is not instructed, the process returns to steps S11 and S31, and the subsequent processes are repeated.

Further, in a case where the end is instructed in steps S15 and S35, the reproduction process ends.

As a result of the process, the tactile data (input tactile data) is converted into the encoded data, and the encoded data is compressed and transmitted. After the encoded data is received, the tactile data (output tactile data) is restored. Therefore, the tactile data can efficiently be transmitted and received, and the delay in the tactile presentation by the tactile presentation unit 53a can be suppressed in the reproduction of the content.

As a result, even when the tactile data of multiple channels involving a plurality of tactile presentation units 53a is transmitted and received, the tactile data can efficiently be transmitted and received. Therefore, the increase in the time required for the transmission and the reception can be suppressed, and the delay in the tactile presentation can be suppressed.

In addition, although there is one tactile presentation unit 53a in the case of the process described above, the process of steps S11 to S13 may be executed for each channel in a case where there is a plurality of tactile presentation units 53a so that the encoded data corresponding to the tactile data of multiple channels is necessary. The encoded data as processing results may be set as, for example, integrated encoded data corresponding to multiple channels as described with reference to FIGS. 13 to 15, and the encoded data may be transmitted to the reception apparatus 52 in step S14.

In this case, the encoded data corresponding to multiple channels may be decoded and converted into tactile data in step S32, and the plurality of tactile presentation units 53a may make a tactile presentation in step S34.

As a result, the same information as the information of another channel can be eliminated as described with reference to FIGS. 14 and 15. Therefore, the tactile data can efficiently be transmitted and received, and the delay in the tactile presentation can more efficiently be suppressed.

<First Modification>

In the example described above, the encoded data including the encoded tactile data (input tactile data) in addition to the image data and the audio data is transmitted from the transmission apparatus 51 to the reception apparatus 52. After the encoded data is received, the tactile data is restored (as output tactile data) from the encoded data. The timing control information used for reproducing the image data and the audio data and the timing control information used for reproducing the tactile data (output tactile data) are independent from each other.

However, the reception apparatus 52 may store the image data and the audio data in the storage unit 133 or the removable storage medium 137 in advance, and only the encoded data including the encoded tactile data (input tactile data) may be transmitted from the transmission apparatus 51 to the reception apparatus 52.

In such a way, the information transmitted and received to and from the transmission apparatus 51 and the reception apparatus 52 is only the encoded data converted from the tactile data (input tactile data). Therefore, the processing time required for the transmission and the reception can be shortened, and the generation of the delay in the tactile presentation caused by the increase in the transmission and reception time of the tactile data can be suppressed.

<Reproduction Process in First Modification>

Figure 19:
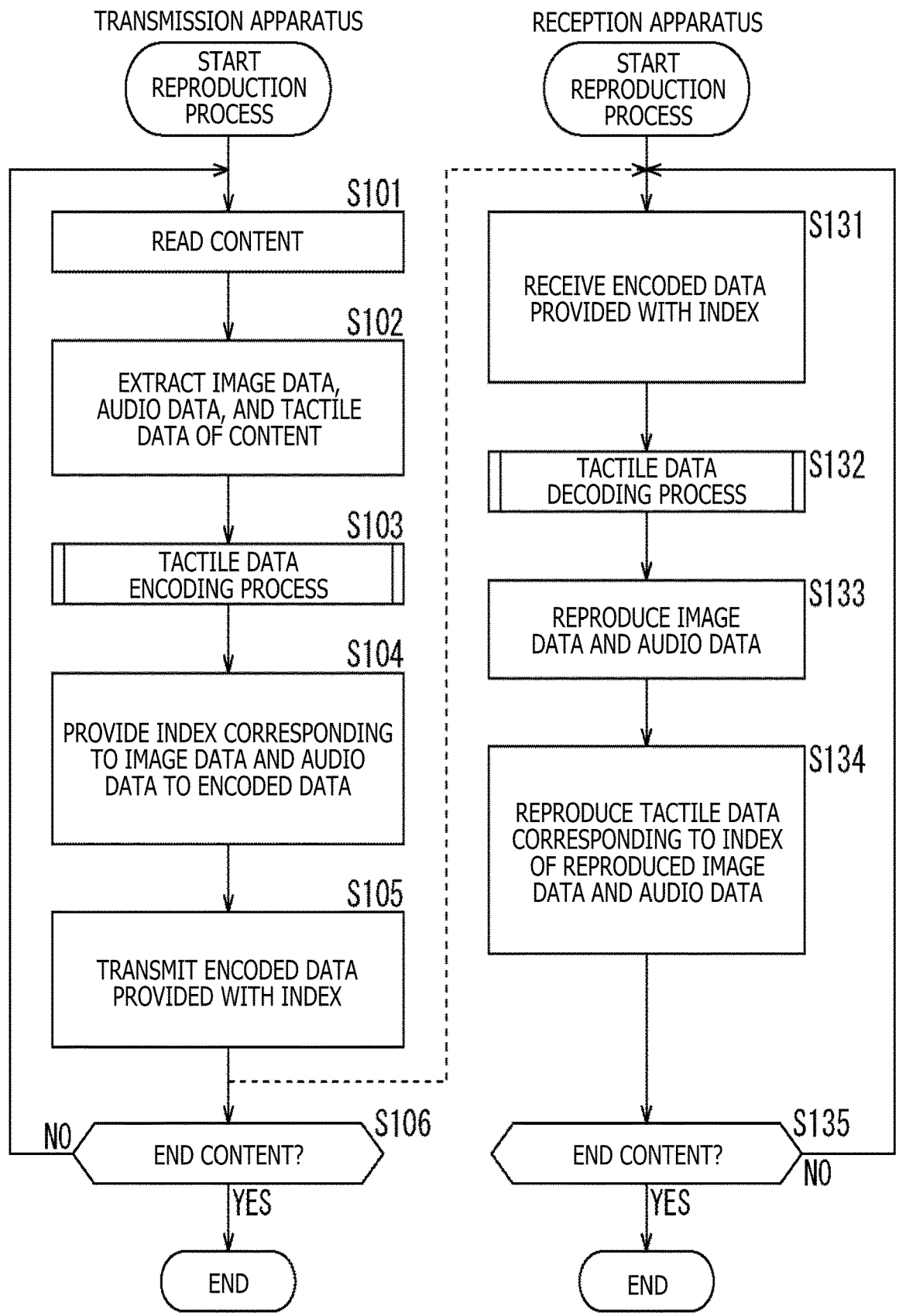
FIG. 19 is a flow chart describing a reproduction process according to a first modification.

Next, a reproduction process of the content in the first modification will be described with reference to a flow chart of FIG. 19. Note that the processes of steps S101 to S103, S106, and S135 in FIG. 19 are similar to the processes of steps S11 to S13, S15, and S35 described with reference to a flow chart of FIG. 16, and the description will not be repeated.

That is, the image data, the audio data, and the encoded data are prepared in steps S101 to S103.

Further, in step S104, the content processing unit 91 provides an index corresponding to the reproduction timing of the image data and the audio data to the generated encoded data.

In step S105, the content processing unit 91 controls the communication unit 72 to transmit only the encoded data provided with the index to the reception apparatus 52.

In step S131, the content processing unit 151 in the control unit 131 of the reception apparatus 52 controls the communication unit 132 to receive the encoded data provided with the index transmitted from the transmission apparatus 51.

In step S132, the tactile data processing unit 152 executes the tactile data decoding process to decode the encoded data in the content data received by the content processing unit 151 into the tactile data (output tactile data). In this case, the tactile data processing unit 152 provides the index provided to the encoded data before decoding to the tactile data after decoding (output tactile data). Note that the tactile data decoding process is similar to the process described with reference to the flow chart of FIG. 18, and the process will not be described.

In step S133, the content processing unit 151 reads the image data and the audio data stored in the storage unit 133 or the removable storage medium 137 and outputs the image data and the audio data to the display apparatus 54. The content processing unit 151 causes the display apparatus 54 to display the images of the content and output the sound.

In step S134, the content processing unit 151 supplies, to the tactile presentation apparatus 53, the tactile data (output tactile data) corresponding to the index indicating the reproduction timing of the image data and the audio data reproduced by the display apparatus 54 and causes the tactile presentation units 53a to make a tactile presentation based on the tactile data (output tactile data).

That is, in this case, only the encoded data provided with the index corresponding to the reproduction timing of the image data and the audio data is transmitted and received. Therefore, the transmission and reception time can be shortened, and the delay in the timing of the tactile presentation by the tactile presentation units 53a from the timing of the output of the image data and the audio data from the display apparatus 54 can be prevented.

In addition, the tactile presentation units 53a make the tactile presentation based on the tactile data (output tactile data) provided with the index corresponding to the reproduction timing of the image data and the audio data. Therefore, the timing of the reproduction of the image and the audio can be synchronized with the timing of the tactile presentation.

Further, even when the tactile presentation units 53a transmit and receive the tactile data of multiple channels, the increase in the transmission and reception time can be suppressed. Therefore, the delay in the tactile presentation can be suppressed.

<Second Modification>

In the example described above, only the encoded data corresponding to the tactile data provided with the index corresponding to the image data and the audio data is transmitted from the transmission apparatus 51 to the reception apparatus 52, and the reception apparatus 52 reproduces the image data and the audio data stored in the reception apparatus 52 and synchronously reproduces the tactile data provided with the corresponding index.

However, the encoded data may be stored in transfer data in a format (multimedia container format) in which the image data, the audio data, and the encoded data (including encoded input tactile data) are integrated in an identifiable state, and a time code for synchronizing the reproduction of the tactile data (output tactile data) decoded from the encoded data with the reproduction of the image data and the audio data may be recorded as meta information in the transfer data. In this case, the transfer data in the format in which the image data, the audio data, and the encoded data corresponding to the encoded data are integrated in an identifiable state is transmitted from the transmission apparatus 51 to the reception apparatus 52. Once the reception apparatus 52 decodes the tactile data (output tactile data) from the encoded data included in the transfer data, the reception apparatus 52 reads the time code recorded as meta information and provides the tactile presentation based on the tactile data (output tactile data) in synchronization with the reproduction of the image data and the audio data.

<Reproduction Process in Second Modification>

Figure 20:
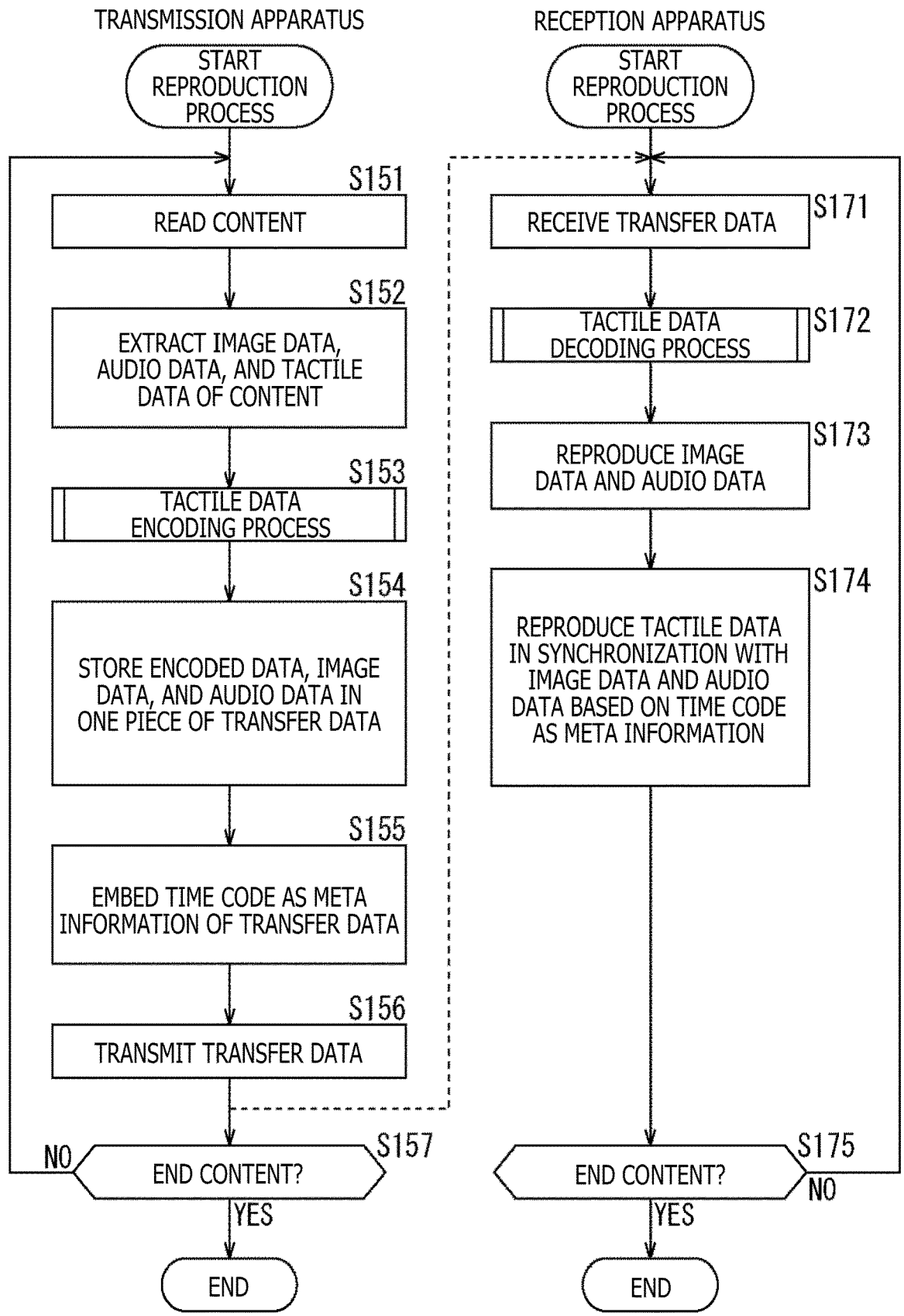
FIG. 20 is a flow chart describing a reproduction process according to a second modification.

Next, a reproduction process of the content in the second modification will be described with reference to a flow chart of FIG. 20. Note that the processes of steps S151 to 153, S156, and S175 in FIG. 20 are similar to the processes of steps S11 to S13, S15, and S35 described with reference to the flow chart of FIG. 16, and the description will not be repeated.

That is, the image data, the audio data, and the encoded data are prepared in steps S151 to S153.

Further, in step S154, the content processing unit 91 stores the generated encoded data, the image data, and the audio data in the transfer data in the format in which the data is integrated in an identifiable state.

In step S155, the content processing unit 91 embeds, as meta information of the transfer data, the time code for reproducing the tactile data (output tactile data) decoded from the encoded data in synchronization with the image data and the audio data.

In step S156, the content processing unit 91 controls the communication unit 72 to transmit the transfer data to the reception apparatus 52.

In step S171, the content processing unit 151 in the control unit 131 of the reception apparatus 52 controls the communication unit 132 to receive the transfer data transmitted from the transmission apparatus 51. As described above, the encoded data, the image data, and the audio data are stored in the transfer data in an identifiable state.

In step S172, the tactile data processing unit 152 executes the tactile data decoding process to extract the encoded data from the transfer data received by the content processing unit 151 to decode the encoded data into the tactile data (output tactile data). Note that the tactile data decoding process is similar to the process described with reference to the flow chart of FIG. 18, and the process will not be described.

In step S173, the content processing unit 151 reads the image data and the audio data and outputs the image data and the audio data to the display apparatus 54. The content processing unit 151 causes the display apparatus 54 to display the images of the content and output the sound.

In step S174, the content processing unit 151 reads the time code embedded as meta information of the transfer data and supplies the tactile data (output tactile data) to the tactile presentation apparatus 53 in synchronization with the image data and the audio data reproduced by the display apparatus 54 based on the time code to cause the tactile presentation units 53a to make the tactile presentation.

That is, in this case, the content processing unit 151 supplies the tactile data (output tactile data) to the tactile presentation apparatus 53 to cause the tactile presentation apparatus 53 to make the tactile presentation in synchronization with the image data and the audio data supplied to and reproduced by the display apparatus 54 based on the time code embedded as meta information. Therefore, the reproduction timing of the image data and the audio data in the display apparatus 54 and the timing of the tactile presentation in the tactile presentation units 53a based on the tactile data (output tactile data) can be synchronized. As a result, the delay in the timing of the tactile presentation by the tactile presentation units 53a from the timing of the output of the image data and the audio data from the display apparatus 54 is prevented.

As a result of the process, the tactile data is converted into the encoded data, and the encoded data is compressed, transmitted, and received. Therefore, the tactile data can efficiently be transmitted and received, and the communication time required for transmitting and receiving the tactile data can be shortened. This can prevent the delay in the tactile presentation by the tactile presentation units 53a in reproducing the content due to the increase in the transmission and reception time of the tactile data of multiple channels.

<Third Modification>

In the example described above, the time code for reproducing the tactile data in synchronization with the image data and the audio data is embedded as meta information in the transfer data in which the encoded data including the encoded tactile data, the image data, and the audio data are integrated in an identifiable state. The transmission apparatus 51 transmits the transfer data to the reception apparatus 52. The reception apparatus 52 reproduces the image data and the audio data and reproduces the tactile data (output tactile data) restored from the encoded data in synchronization with the image data and the audio data based on the time coded embedded as meta information.

However, only the tactile data that can be decoded by the reception apparatus 52 may be converted into the encoded data. As for the tactile data that cannot be decoded, raw tactile data may be transmitted from the transmission apparatus 51 to the reception apparatus 52 along with the image data and the audio data.

<Reproduction Process in Third Modification>

Figure 21:
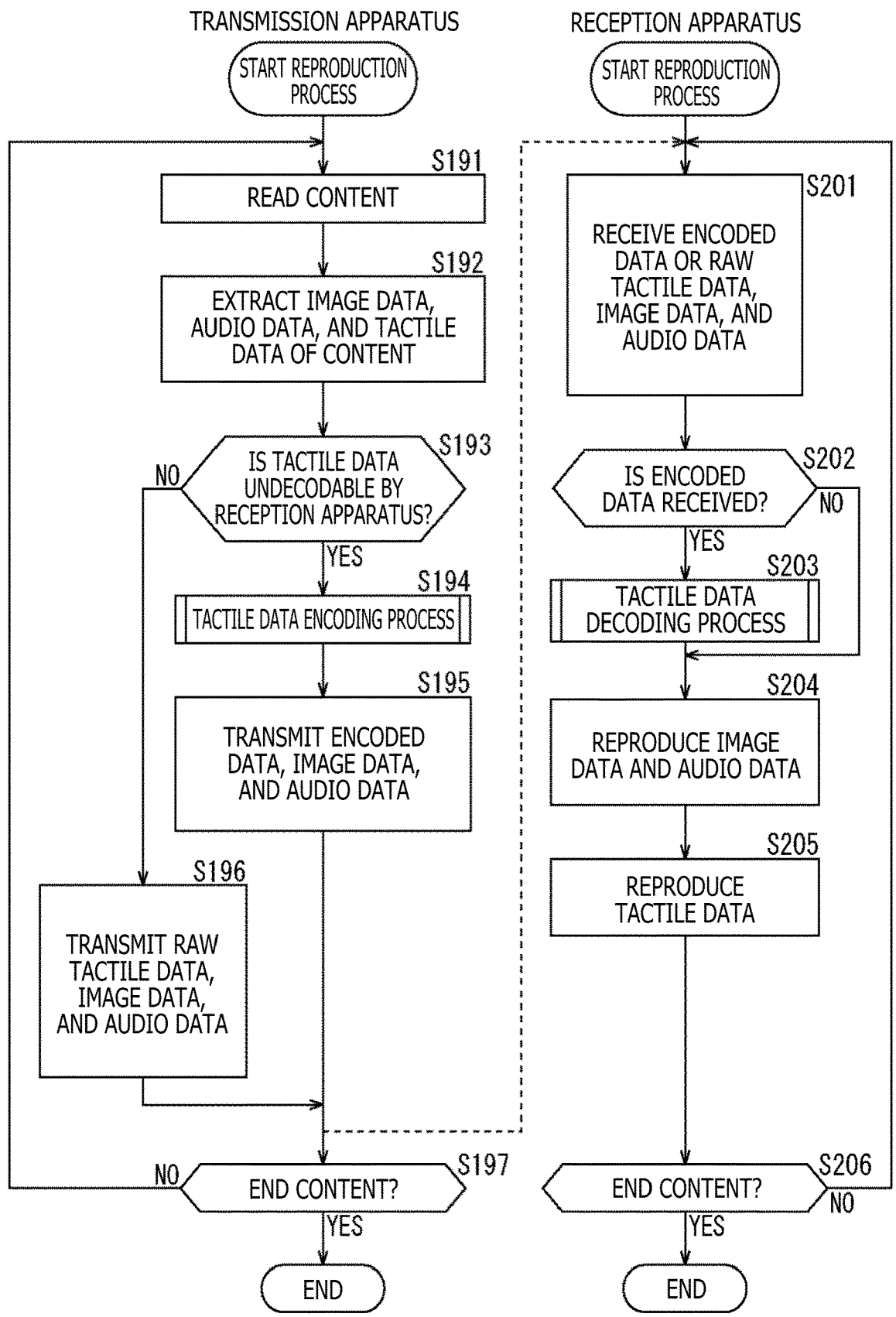
FIG. 21 is a flow chart describing a reproduction process according to a third modification.

Next, a reproduction process of the content in the third modification will be described with reference to a flow chart of FIG. 21. Note that the processes of steps S191, 192, S194, S195, S197, and S203 to S206 in FIG. 21 are similar to the processes of steps S11 to S15 and steps S32 to S35 described with reference to the flow chart of FIG. 16, and the description will not be repeated.

That is, the image data, the audio data, and the tactile data (input tactile data) are read in steps S191 and S192.

In step S193, when the tactile data processing unit 152 encodes the tactile data (input tactile data), the tactile data processing unit 152 determines whether or not the tactile data is undecodable in the reception apparatus 52.

More specifically, the tactile data processing unit 152 may, for example, convert the tactile data (input tactile data) once into the encoded data in the tactile data encoding process and then decode the encoded data into the tactile data (output tactile data) in the tactile data decoding process. The tactile data processing unit 152 may compare the output tactile data as a decoding result and the input tactile data to determine whether the tactile data is undecodable based on the degree of similarity.

In a case where it is determined that the tactile data is decodable instead of undecodable in step S193, the process proceeds to step S194, and the tactile data (input tactile data) is converted into the encoded data in the tactile data encoding process. In step S195, the encoded data is transmitted to the reception apparatus 52 along with the image data and the audio data.

On the other hand, in a case where it is assumed that the tactile data is undecodable in step S193, the process proceeds to step S196.

In step S196, the content processing unit 91 controls the communication unit 72 to transmit the raw tactile data (input tactile data), the image data, and the audio data to the reception apparatus 52.

In step S201, the content processing unit 151 in the control unit 131 of the reception apparatus 52 controls the communication unit 132 to receive the raw tactile data (input tactile data) or the encoded data, the image data, and the audio data transmitted from the transmission apparatus 51.

In step S202, the tactile data processing unit 152 determines whether or not the encoded data is received along with the image data and the audio data. For example, in a case where the encoded data is received along with the image data and the audio data, the process proceeds to step S203.

Further, the encoded data is decoded into the tactile data (output tactile data) in the tactile data decoding process in step S203. In step S204, the display apparatus 54 outputs the images and the sound based on the image data and the audio data. In step S205, the tactile presentation units 53a make the tactile presentation based on the tactile data (output tactile data).

Further, in a case where the raw tactile data (input tactile data), instead of the encoded data, is received along with the image data and the audio data in step S202, the process of step S203 is skipped. In step S204, the images and the sound are output. In step S205, the tactile presentation units 53a make the tactile presentation based on the raw tactile data (input tactile data).

That is, in this case, the content processing unit 151 converts the encoded data into the tactile data (output tactile data) to make the tactile presentation only for the tactile data (input tactile data) that can appropriately be decoded. For the tactile data (input tactile data) that cannot be decoded, the content processing unit 151 uses the raw tactile data (input tactile data) to make the tactile presentation. Therefore, the tactile data can appropriately be reflected to make the tactile presentation.

As a result of the process, the tactile data is converted into the encoded data, and the encoded data is compressed, transmitted, and received. In this way, the tactile data can efficiently be transmitted and received. Therefore, the communication time required for transmitting and receiving the tactile data can be shortened. Even when the tactile data of multiple channels is transmitted and received in the reproduction of the content, an appropriate tactile presentation can be realized while suppressing the delay in the tactile presentation by the tactile presentation units 53a due to the increase in the transmission and reception time.

Note that in the tactile data encoding process and the tactile data decoding process, the number of used base tactile signals may be changed according to the communication band that can be used in the communication between the transmission apparatus 51 and the reception apparatus 52.

Further, in the reception apparatus 52, the tactile data as a decoding result of the encoded data may be stored in the storage unit 133. Further, in a case of transmitting tactile data similar to the stored tactile data, the transmission apparatus 51 may transmit only tactile data specification information for specifying the similarity to certain tactile data. In this case, the reception apparatus 52 may use the tactile data specified based on the tactile data specification information in the tactile data stored in the storage unit 133.

Further, the tactile data may be transmitted and received by switching in real time whether to transmit the encoded data, transmit the tactile data specification information for specifying the already stored tactile data, or transmit the raw tactile data according to the communication conditions, or the transmission methods may be combined.

In addition, part of the tactile data can automatically be generated from the audio data, and therefore, only the difference from the tactile data that can automatically be generated may be transmitted and received as tactile data.

Further, whether or not the tactile data encoding process and the tactile data decoding process can be executed may be determined according to the processing load or the remaining battery of the transmission apparatus 51 and the reception apparatus 52, and the case of transmitting the encoded data and the case of transmitting the raw tactile data may be switched.

In addition, a time stamp on the content for designating the timing of reproducing the tactile data may be added to each base tactile signal, and the tactile presentation may be made according to the time stamp.

Further, the tactile data may be transmitted and received after multiplexing the tactile data with the content data, or the content data and the tactile data may be transmitted as different data.

In addition, flag data indicating whether or not the tactile data is added or indicating the format of the tactile data may be added to the header of the content data. In such a way, the reception apparatus 52 can determine whether or not there is tactile data or determine the format of the tactile data, and the processes can be distinguished and executed.

In the example described above, the reception apparatus 52 causes the display apparatus 54 to display the images and output the sound based on the image data and the audio data included in the content data supplied from the transmission apparatus 51 and further causes the tactile presentation units 53a of the tactile presentation apparatus 53 to make the tactile presentation based on the encoded data corresponding to the tactile data. However, a reception apparatus that causes the display apparatus 54 to display the images and output the sound based on the image data and the audio data and a reception apparatus that causes the tactile presentation units 53a of the tactile presentation apparatus 53 to make the tactile presentation based on the encoded data corresponding to the tactile data may be separately provided.

In addition, other than the transmission apparatus 51, an apparatus with a function of converting the tactile data in the content data into the encoded data may be separately provided, and the transmission apparatus 51 may supply the tactile data to the separately provided apparatus and acquire the converted encoded data.

Further, other than the reception apparatus 52, an apparatus with a function of decoding the encoded data into the tactile data may be provided, and the reception apparatus 552 may supply the encoded data to the separately provided apparatus and use the tactile data decoded from the encoded data to cause the tactile presentation units 53a of the tactile presentation apparatus 53 to make the tactile presentation.

3. Second Embodiment

<Tactile Data Encoding Process Using Machine Learning>

In the examples described above, the frequency analysis or the pattern matching is used to divide the tactile signal (input tactile signal) into the base tactile signal group based on the tactile data (input tactile data), and the divided information is obtained. The parameters set for each base tactile signal based on the divided information are used to encode the divided information and combine the divided information, and the generated combined signal is set to generate the encoded data. The encoded data is decoded to restore the tactile data (output tactile data).

However, the process of dividing the tactile data (input tactile data) into the base tactile signal group to generate the divided information may be a process using an estimator generated based on machine learning.

Here, the tactile data encoding process using machine learning will be described.

In the machine learning, for example, content data 201 including image data and audio data and a corresponding tactile signal (input tactile signal) 202 are used as illustrated in FIG. 22. Note that the tactile signal 202 here is a signal input by the user in association with the content data 201.

Next, feature data 203 including a multi-dimensional feature vector including auditory features extracted from the image data and a multi-dimensional feature vector extracted from visual features extracted from the audio data is generated based on analysis results of audio analysis, dynamic analysis, texture analysis, and the like of the image data and the audio data of the content data 201.

In addition, the tactile signal (input tactile signal) 202 is divided based on the base tactile signal group to generate divided information, and divided information 204 as teacher data is generated.

Further, an estimator (estimator 213 of FIG. 23) that uses the feature data 203 of the content data 201 to estimate the divided information is generated by machine learning using the feature data 203 and the divided information 204 as teacher data.

The estimator (estimator 213 of FIG. 23) estimates the divided signal of the tactile signal (input tactile signal) through the series of machine learning based on the feature data 203.

Figure 23:
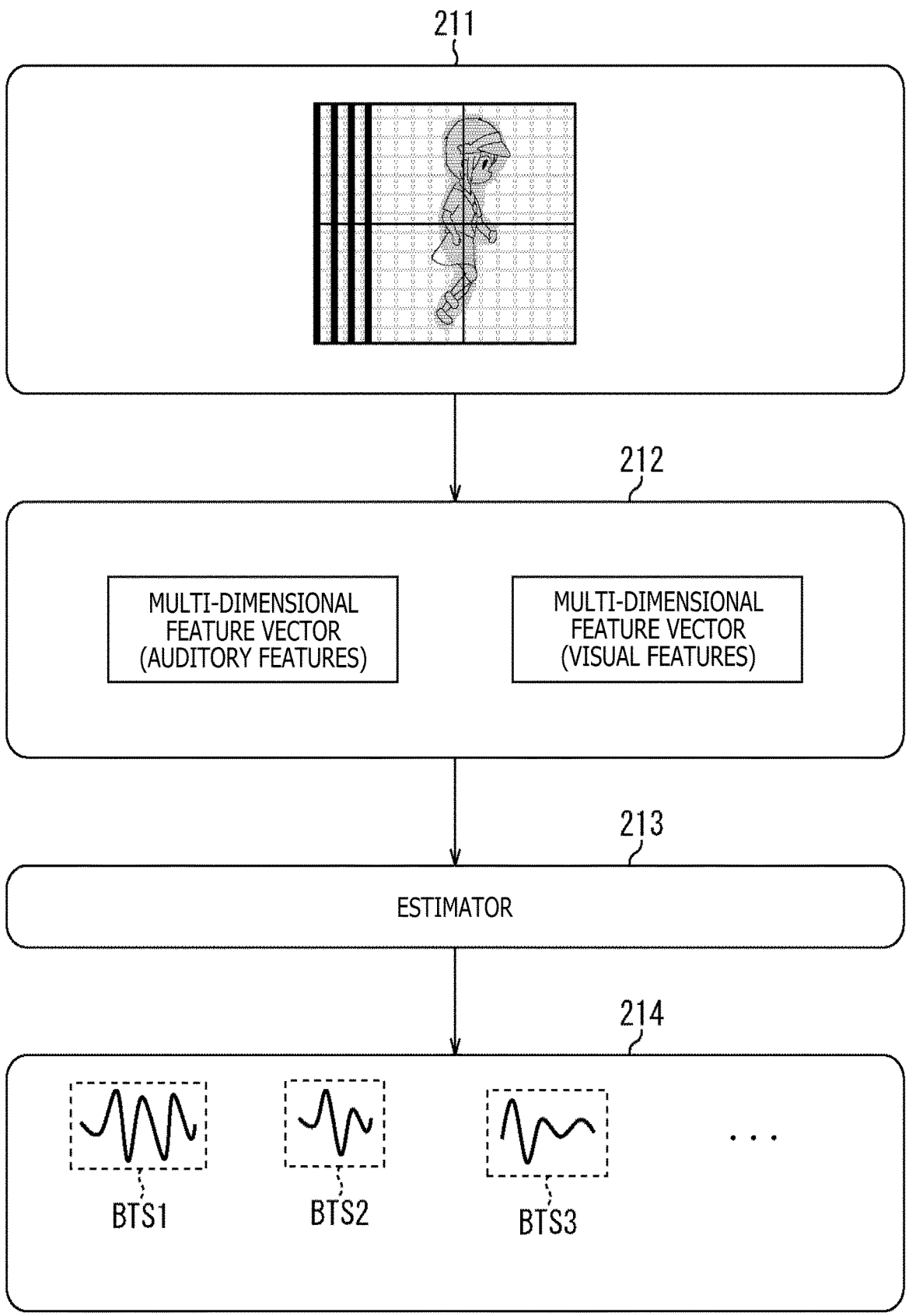
FIG. 23 is a diagram describing a tactile data encoding process using machine learning.

As a result, as illustrated in FIG. 23, a tactile data encoding process using the estimator 213 generated by machine learning is executed to generate feature data 212 including a multi-dimensional feature vector from which the auditory features of the image data are extracted and a multi-dimensional feature vector extracted from the visual features of the audio data based on analysis results of audio analysis, dynamic analysis, texture analysis, and the like of the image data and the audio data included in content data 211.

Further, the estimator 213 generated by machine learning estimates divided information based on the feature data 212 and generates encoded data based on each parameter of the base tactile signal group in the estimated divided information.

<Configuration Example of Learning Apparatus>

Next, a configuration example of a learning apparatus that uses machine learning to generate the estimator 213 of FIG. 23 configured to estimate the divided information based on the feature data of the content will be described with reference to FIG. 24.

A learning apparatus 231 includes a control unit 251, a communication unit 252, a storage unit 253, an input unit 254, an output unit 255, a drive 256, and a removable storage medium 257 that are connected to each other through a bus 258 so that data and programs can be transmitted and received.

The control unit 251 includes a processor and a memory and controls the entire operation of the learning apparatus 231. The control unit 251 includes a machine learning unit 261 that causes the estimator 213 to learn through machine learning.

The machine learning unit 261 includes a feature data extraction unit 271 and a teacher data generation unit 272. As described with reference to FIG. 22, the machine learning unit 261 acquires the content data 201 and the tactile signal (input tactile signal) 202 on the basis of the corresponding tactile data and causes the estimator 213 to learn through, for example, a neural network, a Gaussian mixture model, or the like.

More specifically, the feature data extraction unit 271 extracts the feature data 203 including the multi-dimensional feature vector including the auditory features extracted from the image data and the multi-dimensional feature vector extracted from the visual features extracted from the audio data based on the analysis results of the audio analysis, the dynamic analysis, the texture analysis, and the like of the image data and the audio data of the content data 201.

The teacher data generation unit 272 divides the tactile signal (input tactile signal) 202 on the basis of the tactile data corresponding to the content data 201 input through the input unit 254 to generate the divided information 204 including the base tactile signal group.

The machine learning unit 261 generates the estimator 213 that estimates the divided information based on the feature data 203 through machine learning using the feature data 203 and the divided information 204 as teacher data.

The communication unit 252 is controlled by the control unit 251 and transmits and receives various data and programs through a communication network represented by a LAN (Local Area Network) or the like in wired (or wireless (not illustrated)) communication.

The storage unit 253 is controlled by the control unit 251 and includes an HDD (Hard Disk Drive), an SSD (Solid State Drive), a semiconductor memory, or the like. The storage unit 253 writes or reads various data including the content data and programs.

The input unit 254 includes an input device, such as a keyboard and a mouse, for the user to input an operation command and supplies various input signals to the control unit 251.

The output unit 255 is controlled by the control unit 251 and outputs and displays a supplied processing operation screen or an image of a processing result on a display device not illustrated.

The drive 256 reads and writes data to and from the removable storage medium 257, such as a magnetic disk (including a flexible disk), an optical disk (including a CD-ROM (Compact Disc-Read Only Memory) and a DVD (Digital Versatile Disc)), a magneto-optical disk (including an MD (Mini Disc)), and a semiconductor memory.

<Configuration Example of Transmission Apparatus that Realizes Tactile Data Encoding Process Using Machine Learning>

Next, a configuration example of a transmission apparatus that realizes the tactile data encoding process using machine learning will be described with reference to FIG. 25.

Figure 8:
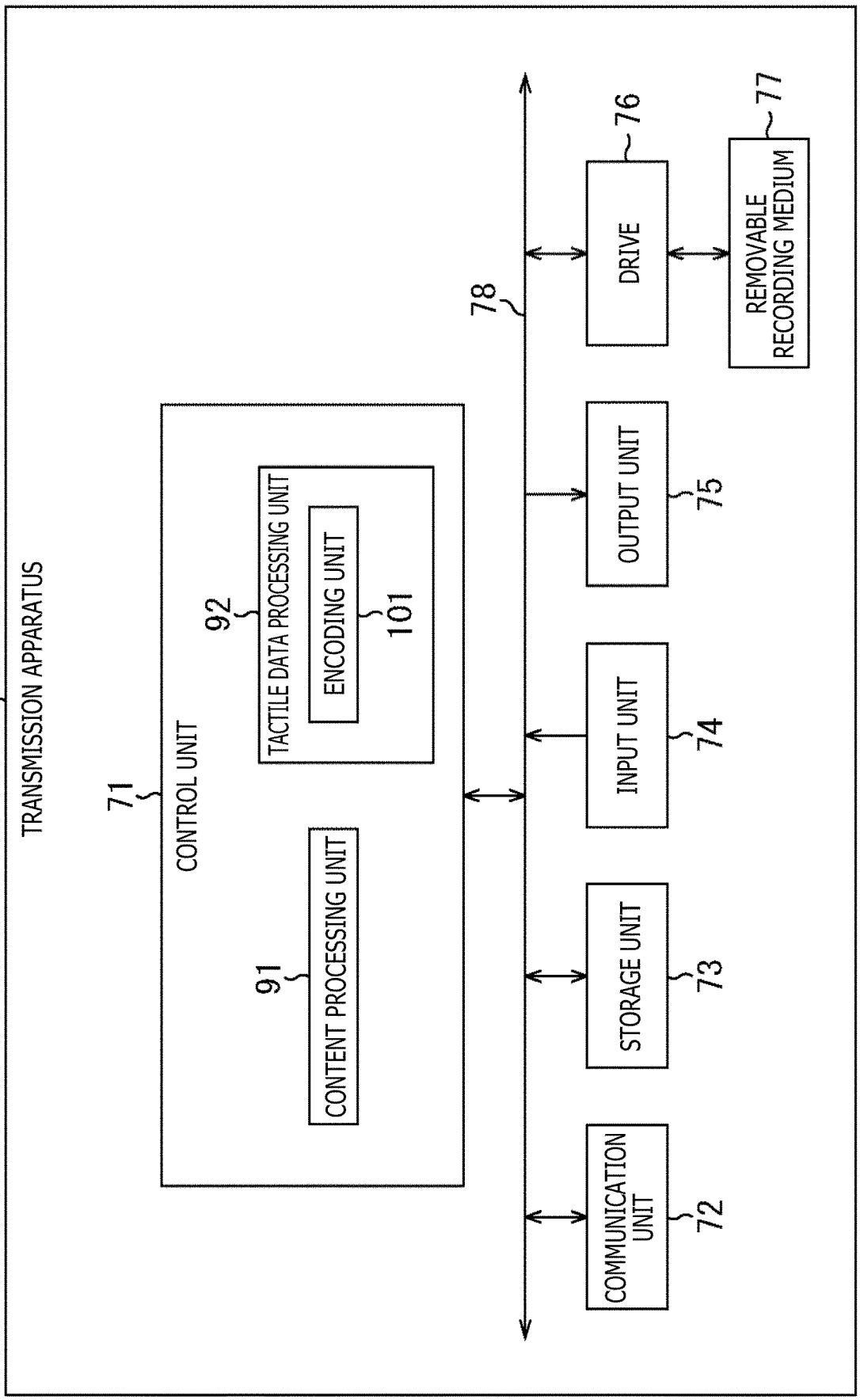
FIG. 8 is a diagram describing a configuration example of a transmission apparatus in FIG. 4.
Figure 25:
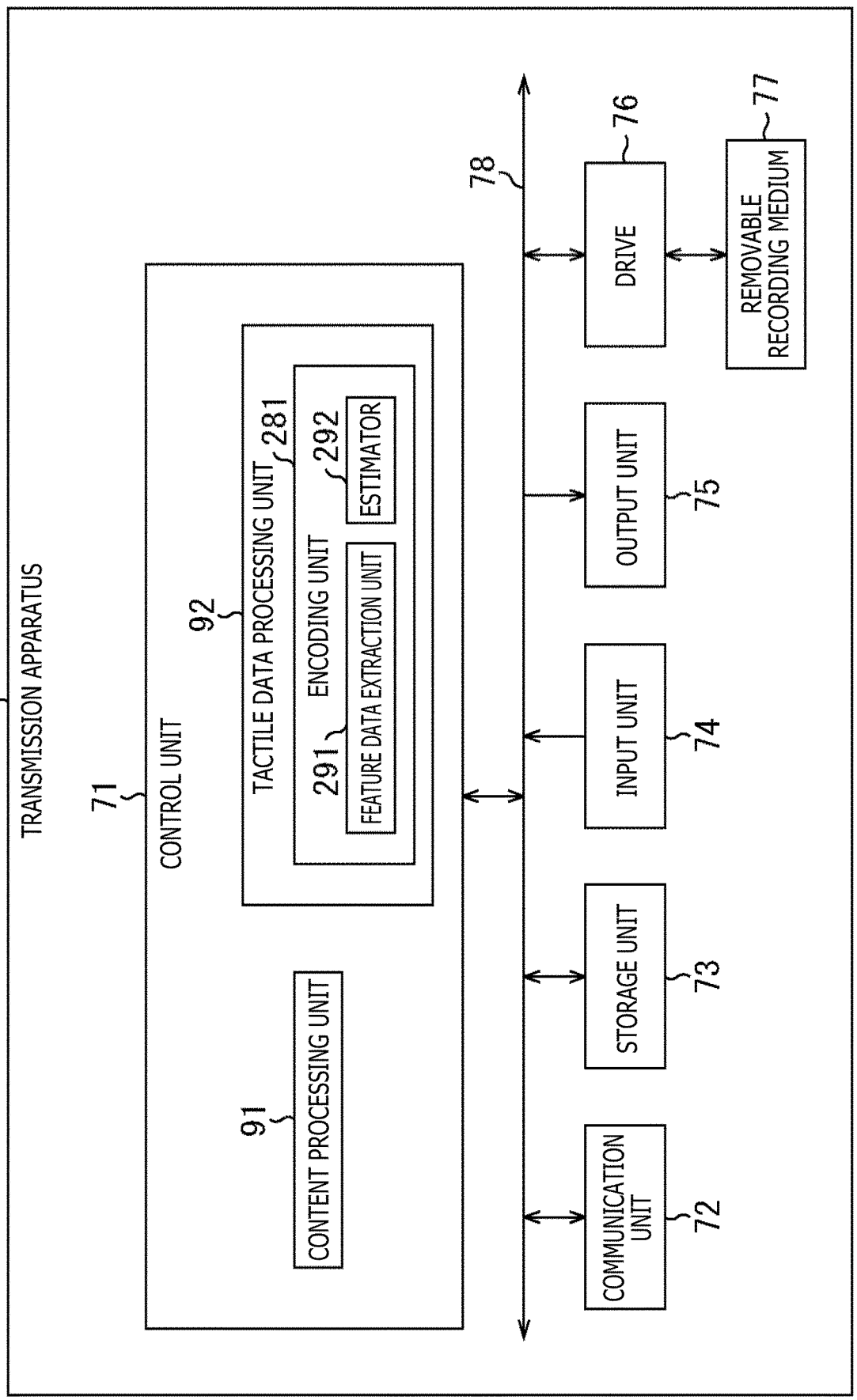
FIG. 25 is a diagram describing a configuration example of a transmission apparatus that realizes the tactile data encoding process using machine learning.
Figure 26:
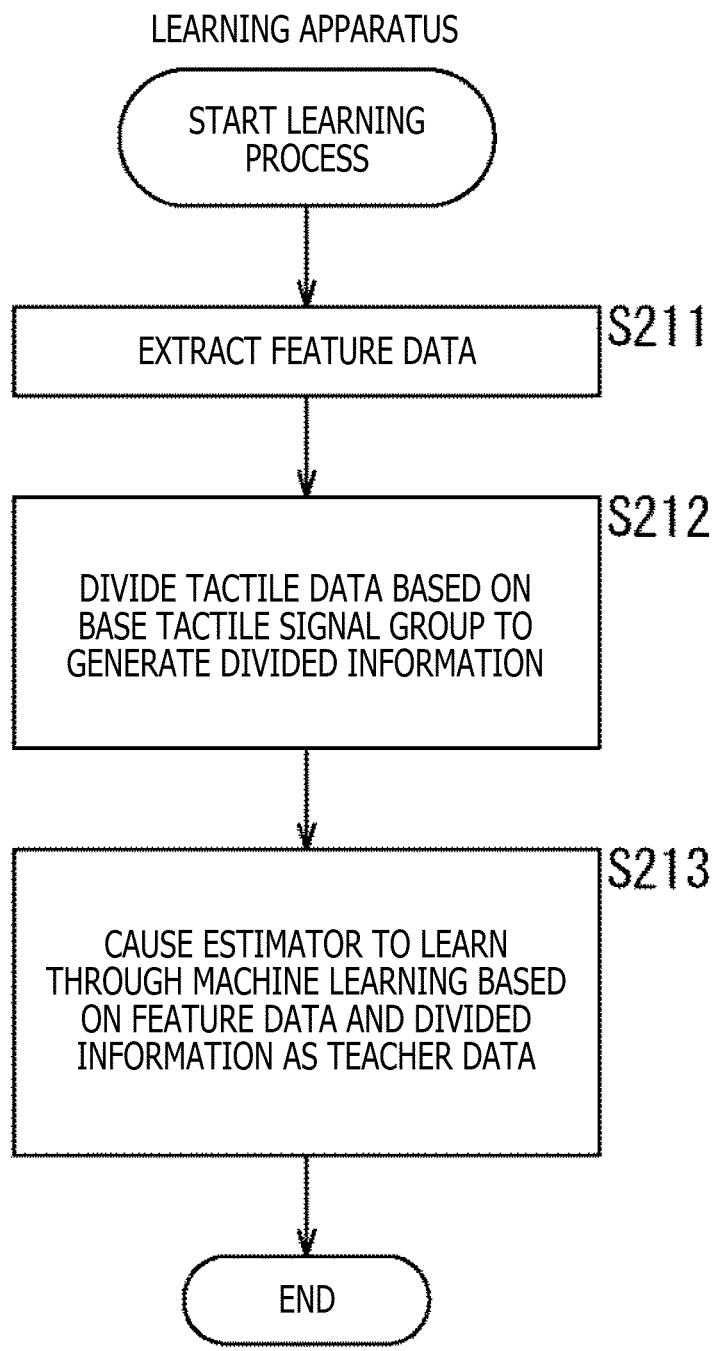
FIG. 26 is a flow chart describing a learning process executed by the learning apparatus in FIG. 24.

Note that the components of the transmission apparatus 51 in FIG. 25 with the same functions as in the components of the transmission apparatus 51 in FIG. 8 are provided with the same signs, and the description will be appropriately skipped.

That is, the transmission apparatus 51 of FIG. 25 is different from the transmission apparatus 51 of FIG. 8 in that an encoding unit 281 is provided in place of the encoding unit 101.

The encoding unit 281 includes a feature data extraction unit 291 and an estimator 292 and generates the encoded data of the tactile data based on the image data and the audio data included in the content data.

More specifically, the feature data extraction unit 291 extracts the feature data from the image data and the audio data.

The estimator 292 has a configuration corresponding to the estimator 213 of FIG. 23. The estimator 292 learns based on the machine learning and estimates the divided information corresponding to the tactile data (input tactile data) based on the feature data. The encoding unit 281 generates the encoded data corresponding to the tactile data (input tactile data) based on the parameters of each base tactile signal of the estimated divided information.

Figure 9:
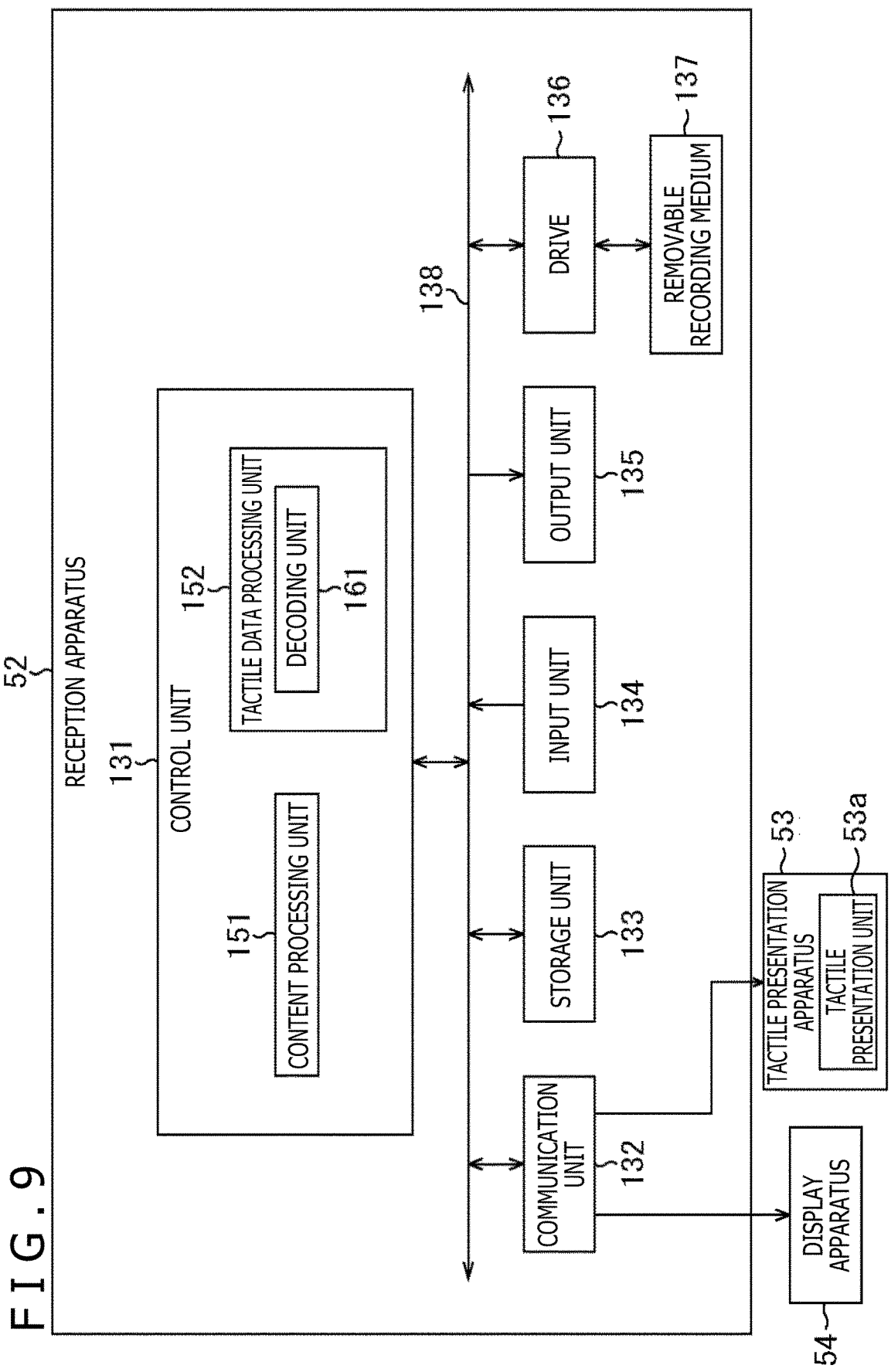
FIG. 9 is a diagram describing a configuration example of a reception apparatus in FIG. 4.

Note that the configuration of the reception apparatus 52 is also similar to the case in FIG. 9, and the reproduction process is similar to the process described above. Therefore, the description will not be repeated.

<Learning Process>

Next, a learning process executed by the learning apparatus 231 of FIG. 24 will be described with reference to a flow chart of FIG. 25.

In step S211, the feature data extraction unit 271 extracts the feature data 203 from the image data and the audio data of the content data 201 input through the input unit 254.

In step S212, the teacher data generation unit 272 divides the tactile signal (input tactile signal) 202 on the basis of the tactile data corresponding to the content data 201 input through the input unit 254 to generate the divided information 204 including the base tactile signal group and generates the divided information 204 as teacher data.

In step S213, the machine learning unit 261 causes the estimator 213 to learn through machine learning using the feature data 203 including the tactile data and the divided information 204 as teacher data.

The process can cause the estimator 213 that estimates the divided information of the tactile signal (input tactile signal)

to learn based on the feature data extracted from the image data and the audio data of the content data in machine learning.

<Tactile Data Encoding Process Using Machine Learning>

Figure 27:
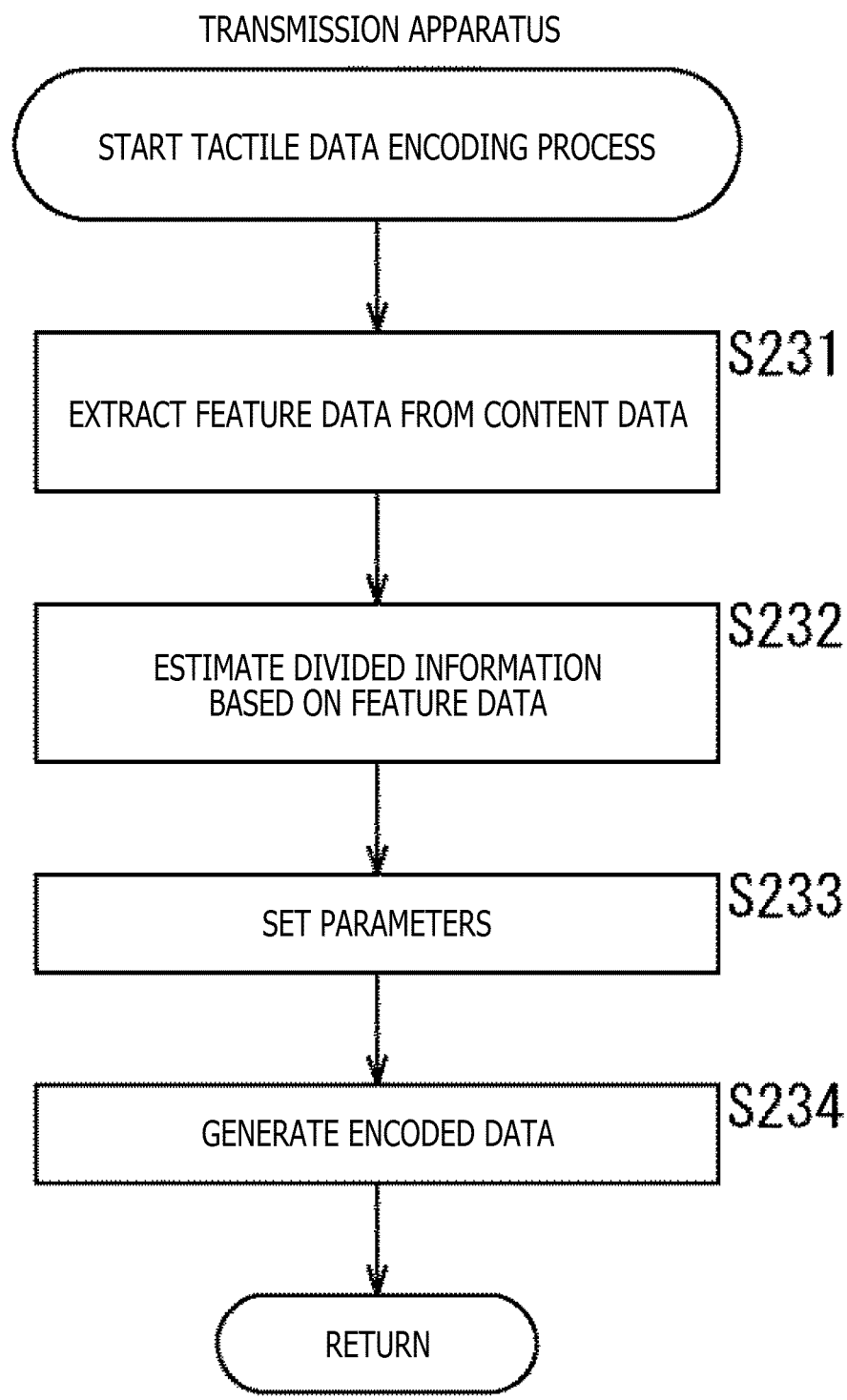
FIG. 27 is a flow chart describing a tactile data encoding process using machine learning.

Next, a tactile data encoding process using the estimator 213 (estimator 292 of FIG. 25) generated through machine learning of the transmission apparatus 51 in FIG. 25 will be described with reference to FIG. 27.

In step S231, the feature data extraction unit 291 of the encoding unit 281 extracts the feature data from the image data and the audio data of the content data.

In step S232, the estimator 292 estimates the divided information of the tactile signal (input tactile signal) corresponding to the feature data.

In step S233, the encoding unit 281 sets the parameters of each base tactile signal based on the divided information estimated by the estimator 292.

In step S234, the encoding unit 281 generates the encoded data corresponding to the tactile signal based on the parameters of each base tactile signal.

As a result of the process, the estimator 292 generated by machine learning estimates the divided information based on the feature data of the image data and the audio data and estimates the encoded data corresponding to the tactile data (input tactile data). Therefore, the tactile data (input tactile data) can more quickly be converted into the encoded data. Note that the tactile data decoding process is similar to the process described with reference to the flow chart of FIG. 18, and the description will not be repeated. In addition, although the feature data is extracted from the image data and the audio data in the learning process and the tactile data encoding process in the example described above, the feature data may also be extracted from the tactile data (input tactile data) in addition to the image data and the audio data. Further, the feature data can be increased so that the estimator can learn with a higher precision.

As described above, according to the present disclosure, the increase in the transmission and reception time can be suppressed in any case even when a plurality of tactile presentation units 53a transmits and receives tactile data of multiple channels, and therefore, the delay in the tactile presentation can be suppressed.

4. Example of Causing Software to Execute

Incidentally, the series of processes described above can be executed by hardware or can be executed by software. In the case where the series of processes are executed by software, a program included in the software is installed from a recording medium on a computer incorporated into dedicated hardware or on, for example, a general-purpose computer or the like that can execute various functions by installing various programs.

Figure 28:
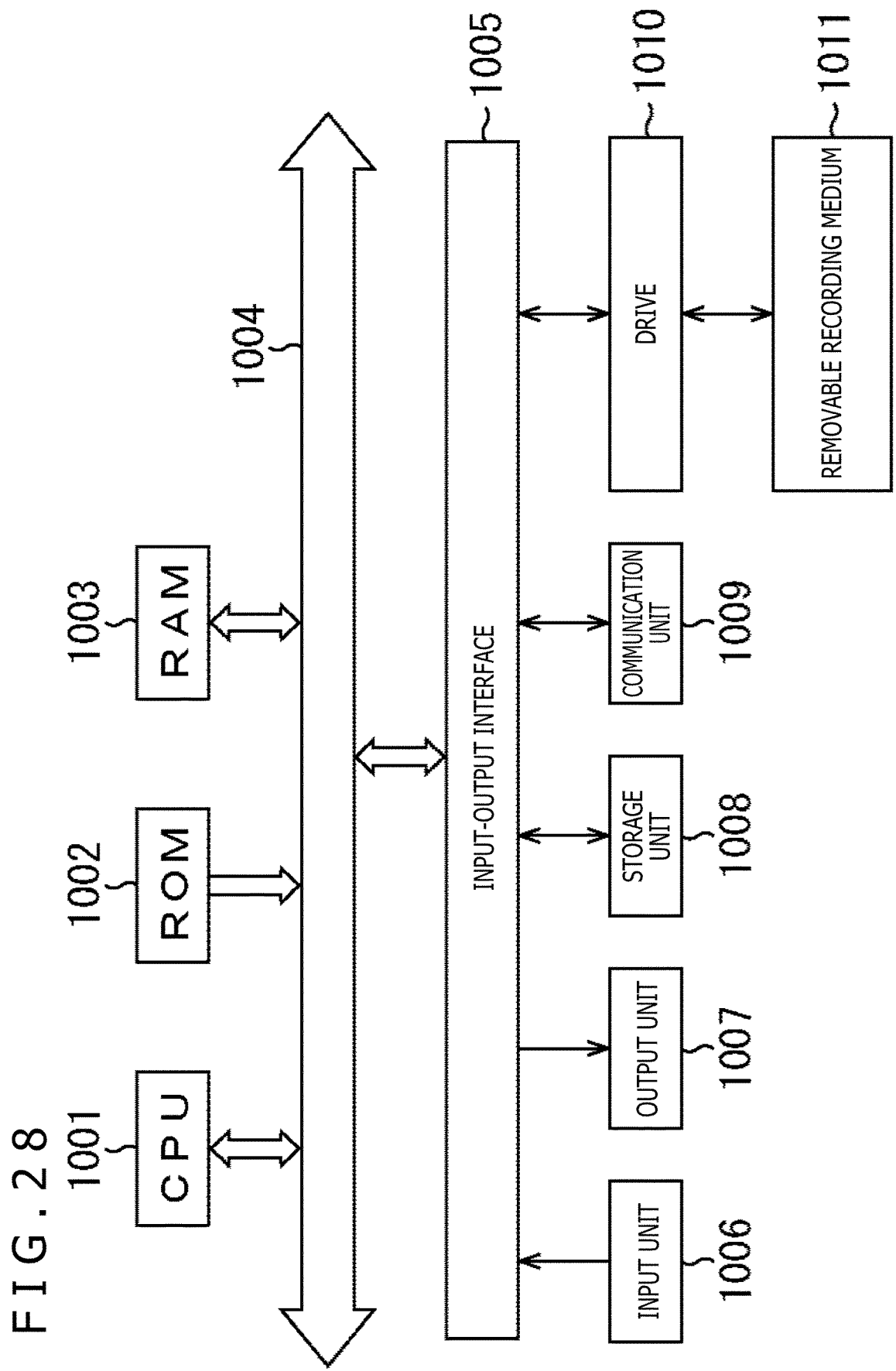
FIG. 28 is a diagram describing a configuration example of a general-purpose personal computer.

FIG. 28 illustrates a configuration example of the general-purpose computer. The personal computer includes a CPU (Central Processing Unit) 1001. An input-output interface 1005 is connected to the CPU 1001 through a bus 1004. A ROM (Read Only Memory) 1002 and a RAM (Random Access Memory) 1003 are connected to the bus 1004.

An input unit 1006 including an input device, such as a keyboard and a mouse, for the user to input an operation command, an output unit 1007 that outputs a processing operation screen or an image of a processing result to a display device, a storage unit 1008 including a hard disk drive or the like that stores programs and various data, and a communication unit 1009 including a LAN (Local Area Network) adapter or the like and configured to execute a communication process through a network represented by the Internet are connected to the input-output interface 1005. In addition, a drive 1010 that reads and writes data to and from a removable storage medium 1011, such as a magnetic disk (including a flexible disk), an optical disk (including a CD-ROM (Compact Disc-Read Only Memory) and a DVD (Digital Versatile Disc)), a magneto-optical disk (including an MD (Mini Disc)), and a semiconductor memory, is connected.

The CPU 1001 executes various processes according to a program stored in the ROM 1002 or a program read from the removable storage medium 1011, such as a magnetic disk, an optical disk, a magneto-optical disk, and a semiconductor memory, installed on the storage unit 1008, and loaded from the storage unit 1008 to the RAM 1003. Data and the like necessary for the CPU 1001 to execute various processes are also appropriately stored in the RAM 1003.

In the computer configured in this way, the CPU 1001 loads, for example, the program stored in the storage unit 1008 to the RAM 1003 through the input-output interface 1005 and the bus 1004 and executes the program to thereby execute the series of processes.

The program executed by the computer (CPU 1001) can be provided by, for example, recording the program in the removable storage medium 1011 as a package medium or the like. In addition, the program can be provided through wired or wireless transmission medium, such as a local area network, the Internet, and digital satellite broadcasting.

In the computer, the removable storage medium 1011 can be mounted on the drive 1010 to install the program on the storage unit 1008 through the input-output interface 1005. In addition, the communication unit 1009 can receive the program through a wired or wireless transmission medium to install the program on the storage unit 1008. Further, the program can be installed in advance on the ROM 1002 or the storage unit 1008.

Note that the program executed by the computer may be a program in which the processes are executed in chronological order described in the present specification, or the program may be a program for executing the processes in parallel or at necessary timing such as when the processes are invoked.

Figure 24:
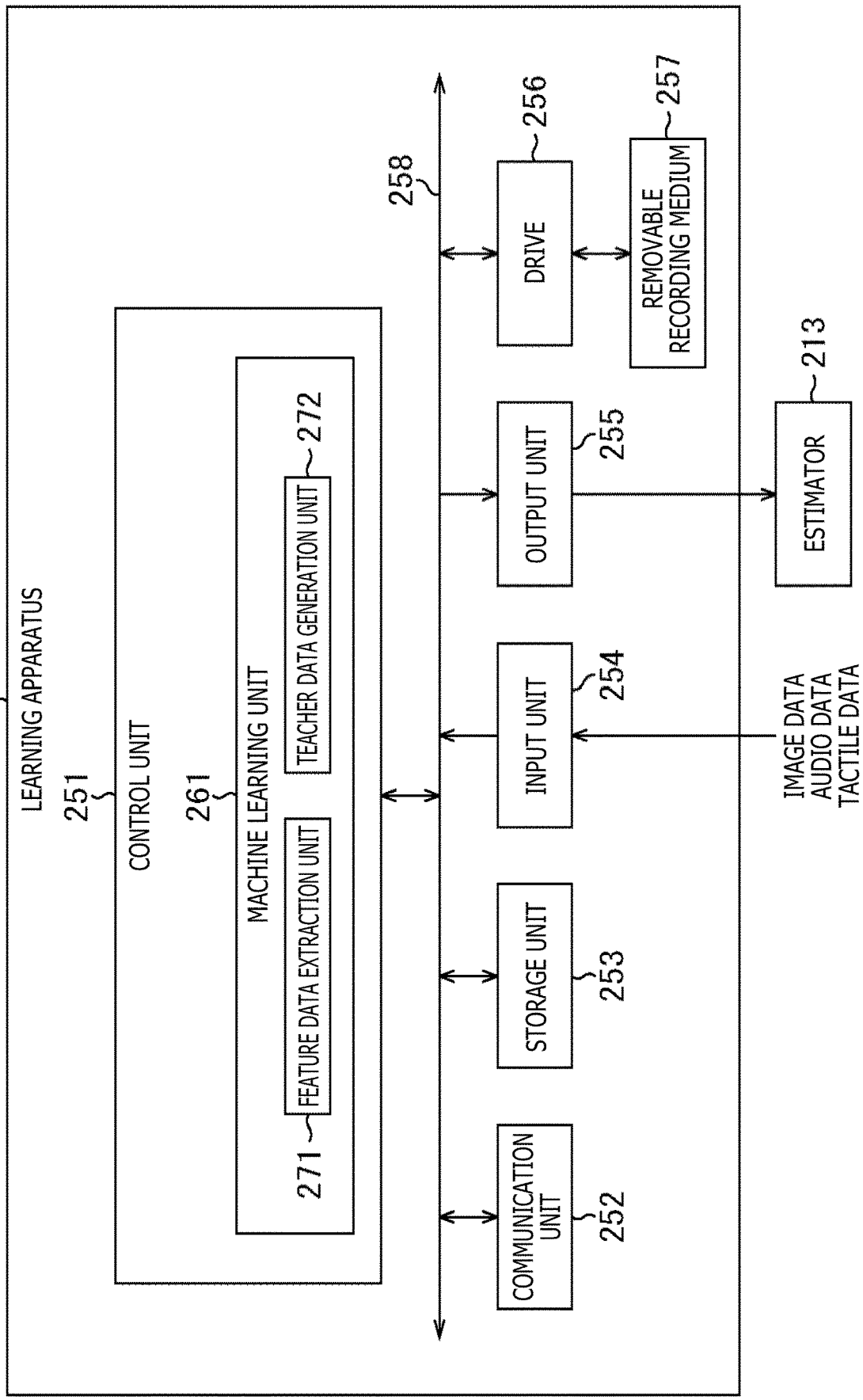
FIG. 24 is a diagram describing a configuration example of a learning apparatus.

Note that the CPU 1001 in FIG. 28 realizes the functions of the control unit 71 in FIGS. 8 and 25, the control unit 131 in FIG. 9, and the control unit 251 in FIG. 24.

In addition, the system in the present specification denotes a set of a plurality of constituent elements (apparatuses, modules (components), and the like), and whether or not all of the constituent elements are in the same housing does not matter. Therefore, a plurality of apparatuses stored in separate housings and connected through a network and one apparatus storing a plurality of modules in one housing are both systems.

Note that the embodiments of the present disclosure are not limited to the embodiments described above, and various changes can be made without departing from the scope of the present disclosure.

For example, the present disclosure can be provided as, for example, cloud computing in which a plurality of apparatuses shares one function and cooperates to execute a process through a network.

In addition, one apparatus can execute each step described in the flow charts, or a plurality of apparatuses can take charge and execute each step.

Further, in the case where one step includes a plurality of processes, one apparatus can execute the plurality of processes included in one step, or a plurality of apparatuses can take charge and execute the processes.

Note that the present disclosure can also be configured as follows.

<1>

An information processing apparatus including:

an encoding unit that encodes an input tactile signal into encoded data including parameters defining a plurality of base tactile signals in a base tactile signal group included in the input tactile signal; and a transmission unit that transmits the encoded data to a reception apparatus that causes a tactile presentation unit configured to make a tactile presentation using an output tactile signal on the basis of the encoded data to make a tactile presentation.

<2>

The information processing apparatus according to <1>, in which the base tactile signals included in the base tactile signal group include tactile signals orthogonal to each other.

<3>

The information processing apparatus according to <1> or <2>, in which a plurality of the tactile presentation units is provided in the other information processing apparatus, and the input tactile signal is set for each channel corresponding to each of the plurality of tactile presentation units.

<4>

The information processing apparatus according to any one of <1> to <3>, in which the parameters defining each of the base tactile signals include an index identifying the base tactile signal, a time code defining an offset of reproduction timing of the base tactile signal, a gain in entire timing of reproducing the base tactile signal, a length of tactile presentation based on the base tactile signal, and an index identifying an envelope indicating a change in gain in reproducing the base tactile signal.

<5>

The information processing apparatus according to any one of <1> to <4>, in which the input tactile signal includes a signal corresponding to content reproduced in synchronization with the output tactile signal, and the transmission unit transmits content data of the content along with the encoded data.

<6>

The information processing apparatus according to any one of <1> to <4>, in which the input tactile signal includes a signal corresponding to content reproduced in synchronization with the output tactile signal, and the transmission unit independently transmits the encoded data and content data of the content to the reception apparatus.

<7>

The information processing apparatus according to any one of <1> to <4>, in which the input tactile signal includes a signal corresponding to content reproduced in synchronization with the output tactile signal, the encoding unit provides an index indicating reproduction timing of the content to the encoded data, and the transmission unit transmits the encoded data provided with the index to the reception apparatus.

<8>

The information processing apparatus according to any one of <1> to <4>, in which the input tactile signal includes a signal corresponding to content reproduced in synchronization with the output tactile signal, the encoding unit integrates the encoded data and the content into one piece of transfer data and records, as meta information of the transfer data, a time code for reproducing the content in synchronization with the output tactile signal, and the transmission unit transmits the transfer data including the time code recorded as the meta information to the reception apparatus.

<9>

The information processing apparatus according to any one of <1> to <4>, in which the input tactile signal includes a signal corresponding to content reproduced in synchronization with the output tactile signal, the encoding unit encodes input tactile data in the input tactile signal that is capable of being decoded by the reception apparatus into the encoded data, and the transmission unit transmits the input tactile data or the encoded data to the reception apparatus.

<10>

The information processing apparatus according to any one of <1> to <4>, in which the input tactile signal includes a signal corresponding to content reproduced in synchronization with the output tactile signal, the encoding unit makes an estimate based on machine learning using divided information as teacher data, the divided information being divided into the base tactile signals of the base tactile signal group included in the input tactile signal, and the content to estimate the divided information from the content and encodes the input tactile signal into the encoded data based on the divided information, and the transmission unit transmits the encoded data to the reception apparatus.

<11>

An information processing method including:

an encoding process of encoding an input tactile signal into encoded data including parameters defining a plurality of base tactile signals in a base tactile signal group included in the input tactile signal; and a transmission process of transmitting the encoded data to a reception apparatus that causes a tactile presentation unit configured to make a tactile presentation to make a tactile presentation based on an output tactile signal on the basis of the encoded data.

<12>

A program causing a computer to function as:

an encoding unit that encodes an input tactile signal into encoded data including parameters defining a plurality of base tactile signals in a base tactile signal group included in the input tactile signal; and a transmission unit that transmits the encoded data to a reception apparatus that causes a tactile presentation unit configured to make a tactile presentation to make a tactile presentation based on an output tactile signal on the basis of the encoded data.

<13>

An information processing apparatus including:

a reception unit that receives encoded data including parameters defining a plurality of base tactile signals in a base tactile signal group included in an input tactile signal; and a decoding unit that combines the base tactile signals to decode the base tactile signals into an output tactile signal based on the parameters defining the plurality of base tactile signals included in the received encoded data.

<14>

The information processing apparatus according to <13>, in which the decoding unit reads and combines the base tactile signals stored in advance in a storage medium to decode the base tactile signals into the output tactile signal based on the parameters of the encoded data.

<15>

The information processing apparatus according to <13> or <14>, in which the parameters structuring each of the base tactile signals include an index identifying the base tactile signal, a time code defining an offset of reproduction timing of the base tactile signal, a gain in entire timing of reproducing the base tactile signal, a length of tactile presentation based on the base tactile signal, and an index identifying an envelope indicating a change in gain in reproducing the base tactile signal.

<16>

The information processing apparatus according to <13> or <14>, in which the output tactile signal includes a signal reproduced in synchronization with reproduction of content.

<17>

The information processing apparatus according to <16>, in which the reception unit independently receives the encoded data and content data of the content, and the information processing apparatus further includes a tactile presentation unit that executes a tactile presentation on the basis of the output tactile signal asynchronously with reproduction of the content when the content is reproduced.

<18>

The information processing apparatus according to <16>, in which the reception unit receives the encoded data provided with an index indicating reproduction timing of the content, and the information processing apparatus further includes a tactile presentation unit that executes a tactile presentation on the basis of the output tactile signal corresponding to the encoded data at timing of reproduction of the content corresponding to the provided index when the content is reproduced.

<19>

The information processing apparatus according to <16>, in which the reception unit receives transfer data, in which the encoded data and the content are integrated and a time code is recorded as meta information, and the information processing apparatus further includes a tactile presentation unit that executes a tactile presentation on the basis of the output tactile signal in synchronization with reproduction of the content based on the time code recorded as the meta information of the transfer data when the content is reproduced.

<20>

The information processing apparatus according to <16>, in which the reception unit receives the output tactile signal or the encoded data, a tactile presentation is made based on the received output tactile signal in a case where the reception unit receives the output tactile signal, the decoding unit combines the base tactile signals to decode the base tactile signals into the output tactile signal based on the parameters of the encoded data in a case where the reception unit receives the encoded data, and the information processing apparatus further includes a tactile presentation unit that executes a tactile presentation on the basis of the output tactile signal decoded by the decoding unit.

<21>

The information processing apparatus according to <16>, in which, based on machine learning using divided information as teacher data, the divided information being divided into the base tactile signals of the base tactile signal group included in the input tactile signal, and the content, the reception unit receives the encoded data encoded based on the divided information estimated from the content, the decoding unit combines the base tactile signals to decode the base tactile signals into the output tactile signal based on the parameters of the encoded data, and the information processing apparatus further includes a tactile presentation unit that executes a tactile presentation on the basis of the output tactile signal.

<22>

An information processing method including:

a reception process of receiving encoded data including parameters defining a plurality of base tactile signals in a base tactile signal group included in an input tactile signal; and a decoding process of combining the base tactile signals to decode the base tactile signals into an output tactile signal based on the parameters defining the plurality of base tactile signals included in the received encoded data.

<23>

A program causing a computer to function as:

a reception unit that receives encoded data including parameters defining a plurality of base tactile signals in a base tactile signal group included in an input tactile signal; and a decoding unit that combines the base tactile signals to decode the base tactile signals into an output tactile signal based on the parameters defining the plurality of base tactile signals included in the received encoded data.

REFERENCE SIGNS LIST

41 Content reproduction system, 51 Transmission apparatus, 52 Reception apparatus, 53, 53A to 53C Tactile presentation apparatus, 53*a*, 53*a*-1 to 53*a*-16, 53*a*-21 to 53*a*-24, 53*a*-31, 53*a*-32 Tactile presentation unit, 71 Control unit, 91 Content processing unit, 92 Tactile data processing unit, 101 Encoding unit, 131 Control unit, 151 Content processing unit, 152 Decoding unit, 231 Learning apparatus, 251 Control unit, 271 Feature data extraction unit, 272 Teacher data generation unit, 281 Encoding unit, 291 Feature data extraction unit, 292 Estimator

The invention claimed is:

1. An information processing apparatus comprising:
an encoding unit that encodes an input tactile signal into encoded data including parameters defining a plurality of base tactile signals in a base tactile signal group included in the input tactile signal; and
a transmission unit that transmits the encoded data to a reception apparatus that causes a tactile presentation unit configured to make a tactile presentation using an output tactile signal on a basis of the encoded data to make a tactile presentation.

2. The information processing apparatus according to claim 1, wherein
the base tactile signals included in the base tactile signal group include tactile signals orthogonal to each other.

3. The information processing apparatus according to claim 1, wherein
a plurality of the tactile presentation units is provided in the other information processing apparatus, and the input tactile signal is set for each channel corresponding to each of the plurality of tactile presentation units.

4. The information processing apparatus according to claim 1, wherein
the parameters defining each of the base tactile signals include an index identifying the base tactile signal, a time code defining an offset of reproduction timing of the base tactile signal, a gain in entire timing of reproducing the base tactile signal, a length of tactile presentation based on the base tactile signal, and an index identifying an envelope indicating a change in gain in reproducing the base tactile signal.

5. The information processing apparatus according to claim 1, wherein
the input tactile signal includes a signal corresponding to content reproduced in synchronization with the output tactile signal, and
the transmission unit transmits content data of the content along with the encoded data.

6. The information processing apparatus according to claim 1, wherein
the input tactile signal includes a signal corresponding to content reproduced in synchronization with the output tactile signal, and
the transmission unit independently transmits the encoded data and content data of the content to the reception apparatus.

7. The information processing apparatus according to claim 1, wherein
the input tactile signal includes a signal corresponding to content reproduced in synchronization with the output tactile signal,
the encoding unit provides an index indicating reproduction timing of the content to the encoded data, and
the transmission unit transmits the encoded data provided with the index to the reception apparatus.

8. The information processing apparatus according to claim 1, wherein
the input tactile signal includes a signal corresponding to content reproduced in synchronization with the output tactile signal,
the encoding unit integrates the encoded data and the content into one piece of transfer data and records, as meta information of the transfer data, a time code for reproducing the content in synchronization with the output tactile signal, and
the transmission unit transmits the transfer data including the time code recorded as the meta information to the reception apparatus.

9. The information processing apparatus according to claim 1, wherein
the input tactile signal includes a signal corresponding to content reproduced in synchronization with the output tactile signal,
the encoding unit encodes input tactile data in the input tactile signal that is capable of being decoded by the reception apparatus into the encoded data, and
the transmission unit transmits the input tactile data or the encoded data to the reception apparatus.

10. The information processing apparatus according to claim 1, wherein
the input tactile signal includes a signal corresponding to content reproduced in synchronization with the output tactile signal,
the encoding unit makes an estimate based on machine learning using divided information as teacher data, the divided information being divided into the base tactile signals of the base tactile signal group included in the input tactile signal, and the content to estimate the divided information from the content and encodes the input tactile signal into the encoded data based on the divided information, and
the transmission unit transmits the encoded data to the reception apparatus.

11. An information processing method comprising:
an encoding process of encoding an input tactile signal into encoded data including parameters defining a plurality of base tactile signals in a base tactile signal group included in the input tactile signal; and
a transmission process of transmitting the encoded data to a reception apparatus that causes a tactile presentation unit configured to make a tactile presentation to make a tactile presentation based on an output tactile signal on a basis of the encoded data.

12. A program causing a computer to function as:
an encoding unit that encodes an input tactile signal into encoded data including parameters defining a plurality of base tactile signals in a base tactile signal group included in the input tactile signal; and
a transmission unit that transmits the encoded data to a reception apparatus that causes a tactile presentation unit configured to make a tactile presentation to make a tactile presentation based on an output tactile signal on a basis of the encoded data.

13. An information processing apparatus comprising:
a reception unit that receives encoded data including parameters defining a plurality of base tactile signals in a base tactile signal group included in an input tactile signal; and
a decoding unit that combines the base tactile signals to decode the base tactile signals into an output tactile signal based on the parameters defining the plurality of base tactile signals included in the received encoded data.

14. The information processing apparatus according to claim 13, wherein
the decoding unit reads and combines the base tactile signals stored in advance in a storage medium to decode the base tactile signals into the output tactile signal based on the parameters of the encoded data.

15. The information processing apparatus according to claim 13, wherein the parameters structuring each of the base tactile signals include an index identifying the base tactile signal, a time code defining an offset of reproduction timing of the base tactile signal, a gain in entire timing of reproducing the base tactile signal, a length of tactile presentation based on the base tactile signal, and an index identifying an envelope indicating a change in gain in reproducing the base tactile signal.

16. The information processing apparatus according to claim 13, wherein
the output tactile signal includes a signal reproduced in synchronization with reproduction of content.

17. The information processing apparatus according to claim 16, wherein
the reception unit independently receives the encoded data and content data of the content, and
the information processing apparatus further includes a tactile presentation unit that executes a tactile presentation on a basis of the output tactile signal asynchronously with reproduction of the content when the content is reproduced.

18. The information processing apparatus according to claim 16, wherein
the reception unit receives the encoded data provided with an index indicating reproduction timing of the content, and
the information processing apparatus further includes a tactile presentation unit that executes a tactile presentation on a basis of the output tactile signal corresponding to the encoded data at timing of reproduction of the content corresponding to the provided index when the content is reproduced.

19. The information processing apparatus according to claim 16, wherein
the reception unit receives transfer data, in which the encoded data and the content are integrated and a time code is recorded as meta information, and
the information processing apparatus further includes a tactile presentation unit that executes a tactile presentation on a basis of the output tactile signal in synchronization with reproduction of the content based on the time code recorded as the meta information of the transfer data when the content is reproduced.

20. The information processing apparatus according to claim 16, wherein
the reception unit receives the output tactile signal or the encoded data,
a tactile presentation is made based on the received output tactile signal in a case where the reception unit receives the output tactile signal,
the decoding unit combines the base tactile signals to decode the base tactile signals into the output tactile signal based on the parameters of the encoded data in a case where the reception unit receives the encoded data, and
the information processing apparatus further includes a tactile presentation unit that executes a tactile presentation on a basis of the output tactile signal decoded by the decoding unit.

21. The information processing apparatus according to claim 16, wherein,
based on machine learning using divided information as teacher data, the divided information being divided into the base tactile signals of the base tactile signal group included in the input tactile signal, and the content, the reception unit receives the encoded data encoded based on the divided information estimated from the content,
the decoding unit combines the base tactile signals to decode the base tactile signals into the output tactile signal based on the parameters of the encoded data, and
the information processing apparatus further includes a tactile presentation unit that executes a tactile presentation on a basis of the output tactile signal.

22. An information processing method comprising:
a reception process of receiving encoded data including parameters defining a plurality of base tactile signals in a base tactile signal group included in an input tactile signal; and
a decoding process of combining the base tactile signals to decode the base tactile signals into an output tactile signal based on the parameters defining the plurality of base tactile signals included in the received encoded data.

23. A program causing a computer to function as:
a reception unit that receives encoded data including parameters defining a plurality of base tactile signals in a base tactile signal group included in an input tactile signal; and
a decoding unit that combines the base tactile signals to decode the base tactile signals into an output tactile signal based on the parameters defining the plurality of base tactile signals included in the received encoded data.

* * * * *